(12) United States Patent
Komatsu

(10) Patent No.: US 8,176,073 B2
(45) Date of Patent: May 8, 2012

(54) IMAGING DEVICE

(75) Inventor: Koji Komatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 12/570,740

(22) Filed: Sep. 30, 2009

(65) Prior Publication Data
US 2010/0145980 A1    Jun. 10, 2010

(30) Foreign Application Priority Data

Sep. 30, 2008   (JP) ................................. 2008-253971

(51) Int. Cl.
*G06F 7/00* (2006.01)
*G06F 17/30* (2006.01)
(52) U.S. Cl. ......... 707/769; 707/736; 707/821; 707/913
(58) Field of Classification Search .................. 707/769, 707/736, 821
See application file for complete search history.

(56) References Cited

U.S. PATENT DOCUMENTS

| | | | |
|---|---|---|---|
| 2004/0109062 A1 | 6/2004 | Yamaya | |
| 2004/0117411 A1* | 6/2004 | Ueda et al. ................. | 707/200 |
| 2005/0154747 A1* | 7/2005 | Kii et al. ................... | 707/101 |
| 2006/0165380 A1* | 7/2006 | Tanaka et al. .............. | 386/95 |
| 2007/0081088 A1* | 4/2007 | Gotoh et al. ............ | 348/333.01 |
| 2007/0185890 A1* | 8/2007 | VanEpps et al. ............. | 707/101 |
| 2008/0244093 A1* | 10/2008 | Hara ............................ | 709/247 |
| 2008/0297607 A1* | 12/2008 | Minatogawa ............... | 348/207.1 |
| 2008/0306921 A1* | 12/2008 | Rothmuller et al. ............. | 707/3 |
| 2009/0204641 A1* | 8/2009 | Chambers .................. | 707/104.1 |

FOREIGN PATENT DOCUMENTS

JP    3622691    12/2004

OTHER PUBLICATIONS

U.S. Appl. No. 12/570,274, filed Sep. 30, 2009, Komatsu.

* cited by examiner

*Primary Examiner* — Charles Kim
*Assistant Examiner* — Jessica N Le
(74) *Attorney, Agent, or Firm* — Oblon, Spivak, McClelland, Maier & Neustadt, L.L.P.

(57) ABSTRACT

There is provided an imaging device including a first processor for, when a group and a data position in a group are specified for data divided to one or plurality of groups, transmitting data of the specified data position through a first signal line; and a second processor including a first display for displaying a group element for selecting each group by a number determined based on number of groups, a second display for displaying, when the group element displayed is selected, data element for selecting each data by a number determined based on number of data belonging to the group of the selected group element, and a data transmission requesting unit for, when the data element is selected, specifying a group to which the data of the selected data element belongs and the data position in the group, and requesting data transmission to the first processor.

8 Claims, 19 Drawing Sheets

FIG.8

ONE EXAMPLE OF OBJECT HANDLING LIST OF GENERAL PTP

| OBJECT HANDLE NUMBER | ATTRIBUTE | OBJECT |
|---|---|---|
| 00000001 | FOLDER | ROOT |
| 01000001 | FOLDER | 100MSDCF |
| 01010001 | FILE | DSC01.JPG |
| 01020001 | FILE | DSC02.JPG |
| 01030001 | FILE | DSC03.JPG |
| 01040001 | FILE | DSC04.JPG |
| 01050001 | FILE | DSC05.JPG |
| 01060001 | FILE | DSC06.JPG |
| 01070001 | FILE | DSC07.JPG |
| 01080001 | FILE | DSC08.JPG |
| 01000002 | FOLDER | 101MSDCF |
| 01010002 | FILE | DSC09.JPG |

FIG.9

ONE EXAMPLE OF OBJECT HANDLING LIST

| OBJECT HANDLE NUMBER | ATTRIBUTE | OBJECT |
|---|---|---|
| 00000001 | FOLDER | ROOT |
| 01000001 | FOLDER | 100MSDCF |
| 01010001 | FILE | DSC01.JPG |
| 01020001 | FILE | DSC02.JPG |
| 01030001 | FILE | DSC03.JPG |
| 01040001 | FILE | DSC04.JPG |
| 01050001 | FILE | DSC05.JPG |
| 01060001 | FILE | DSC06.JPG |
| 01070001 | FILE | DSC07.JPG |
| 01080001 | FILE | DSC08.JPG |
| 01000002 | FOLDER | 101MSDCF |
| 01010002 | FILE | DSC09.JPG |
| 02000001 | FOLDER | FAVORITE 1 |
| 02010001 | FILE | DSC01.JPG |
| 02020001 | FILE | DSC02.JPG |
| 02030001 | FILE | DSC04.JPG |
| 02000002 | FOLDER | FAVORITE 2 |
| 02010002 | FILE | DSC03.JPG |
| 02000003 | FOLDER | FAVORITE 3 |
| 02010003 | FILE | DSC05.JPG |
| 02020003 | FILE | DSC07.JPG |
| 02030003 | FILE | DSC08.JPG |
| 02040003 | FILE | DSC09.JPG |

ACTUAL FOLDER PORTION: rows 00000001 through 01010002

VIRTUAL FOLDER PORTION: rows 02000001 through 02040003

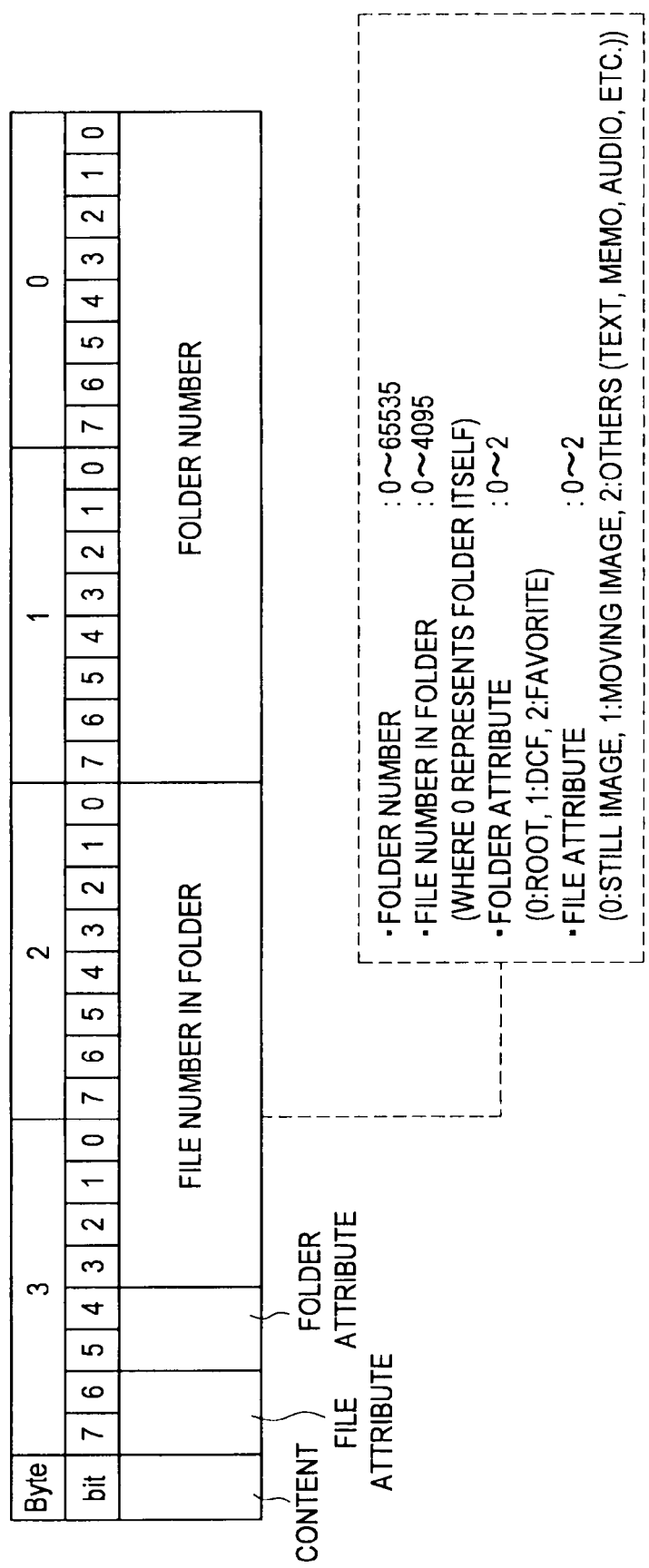

IMAGING DEVICE

BACKGROUND OF THE INVENTION

1. Field of the Invention

The present invention relates to an imaging device.

2. Description of the Related Art

Video data and audio data can be used in the form of digital data with significant progress in the information processing technique and the communication technique. The broadcast data received with a broadcasting device or the image data photographed with the imaging device are moved to various types of information processing devices, portable devices, and the like, and managed and viewed or listened in the devices of the moved destination. In particular, the still image data and the moving image data photographed with the imaging device are often moved to and reproduced at a large-screen television receiver or a personal computer (hereinafter referred to as PC). In this case, a connection interface called USB (Universal Serial Bus) is used for the movement of data.

Some USB interfaces are based on a mass storage class interface and some are based on a still image class interface. The data transmission protocol in the still image class interface includes PTP (Picture Transfer Protocol). The PTP is literally a protocol used in transmitting the image data using the USB interface. For instance, the image data is transmitted according to the PTP between the imaging device and the PC connected with the USB interface. With regards to the transmission method of the image data, Japanese Patent No. 3622691 discloses a technique for realizing the transmission of information related to the association of the image and the category in the framework of the PTP with respect to the categorized images.

SUMMARY OF THE INVENTION

In the PTP, a list of images and the like (object handling list) recorded in the imaging device is transmitted beforehand when transmitting the image from the imaging device to the PC. It is difficult to grasp the directory structure from the object handling list even if the imaging device is managing the image data with the directory structure. Thus, in order for the PC to grasp the directory structure, the directory stored with each image is to be inquired to the imaging device for every image. As a result, the time for grasping the directory structure becomes long in proportion to the number of images. Furthermore, if the images are classified into categories or groups, the object handling list is required to acquire the information of such categories or groups.

However, the acquiring time of the object handling list becomes longer, the greater the number of images as the size of the object handling list also becomes large in proportion to the number of images. For instance, if a time of about 20 milliseconds is necessary for one image to execute such processes, a time of about 80 seconds is necessary if the number of images is 4000. Normally, when the user views the image, the image or the image list the user actually desires to display is often limited to a few. When displaying only the list of images or displaying only the category of the images, it is very inefficient to acquire the object handling list including the information of all images.

The present invention addresses the above-identified, and other issues associated with conventional methods and apparatuses, and it is desirable to provide a new and improved imaging device capable of increasing the speed in the display of classification information such as categories or groups.

In order to solve the above issue, according to an embodiment of the present invention, there is provided an imaging device including: a first processing unit for, when a desired group and a data position in the desired group are specified for data divided by groups, transmitting data of the specified data position to a second processing unit through a first signal line; and the second processing unit including, a control unit for displaying on a display unit a group object for selecting a group based on number of groups, and displaying on the display unit, when a desired group object is selected, a data object for selecting the data based on number of data belonging to a group of the selected desired group object, and a requesting unit for, when the desired data object is selected, specifying the group to which the data of the selected desired data object belongs and the data position in the group, and requesting transmission of the desired data to the first processing unit.

The second processing unit may further include an acquiring unit for acquiring the number of groups from the first processing unit through a second signal line different from the first signal line. In this case, the control unit may display the group object on the display unit based on the number of groups acquired through the second signal line.

The acquiring unit may acquire, when the group object is selected, the number of data belonging to the group of the selected group object from the first processing unit through the second signal line. In this case, the control unit may display the data object on the display unit based on the number of data acquired through the second signal line.

When the number of data is greater than the number of data objects displayable on one screen, the requesting unit may request for transmission of data by the number same as the number of data objects displayable on the one screen.

When the number of data belonging to the group of the selected group object is smaller than the number of data objects displayable on one screen, the acquiring unit may acquire number of data belonging to another group different from the group. In this case, the control unit may display the data object of the data belonging to the another group on the display unit.

When the acquiring unit acquires the number of data belonging to the another group, the requesting unit may request for transmission of the data belonging to the another group by the amount displayed by the display unit.

The requesting unit may transmit group information for specifying the group, data position information indicating the data position in the group specified with the group information, and a transmission frame including data attribute information indicating the attribute of the data specified with the data position information.

The transmission frame may include group attribute indicating whether the group is automatically generated or is generated in advance by the user.

The first signal line may be a signal line of USB (Universal Serial Bus) method. Further, the second signal line may be a signal line of UART (Universal Asynchronous Receiver Transmitter) method. In this case, the requesting unit may request for transmission of the data using a PTP (Picture Transfer Protocol) command.

In order to solve the above issue, according to another embodiment of the present invention, there is provided a program for causing a computer to realize the function of each component of the imaging device. There can be also provided a recording medium recorded with such program. In order to solve the above issue, according to another further embodiment of the present invention, there can be provided an image processing device mounted with the function of each component of the imaging device.

According to the embodiments of the present invention described above, the speed of the display of classification information such as categories and groups can be increased.

BRIEF DESCRIPTION OF THE DRAWINGS

FIG. 8 shows a configuration example of the object handling list;

FIG. 9 shows a configuration example of the object handling list;

FIG. 10 shows a configuration example of an image data requesting frame according to the embodiment;

DETAILED DESCRIPTION OF THE PREFERRED EMBODIMENTS

Figure 1:
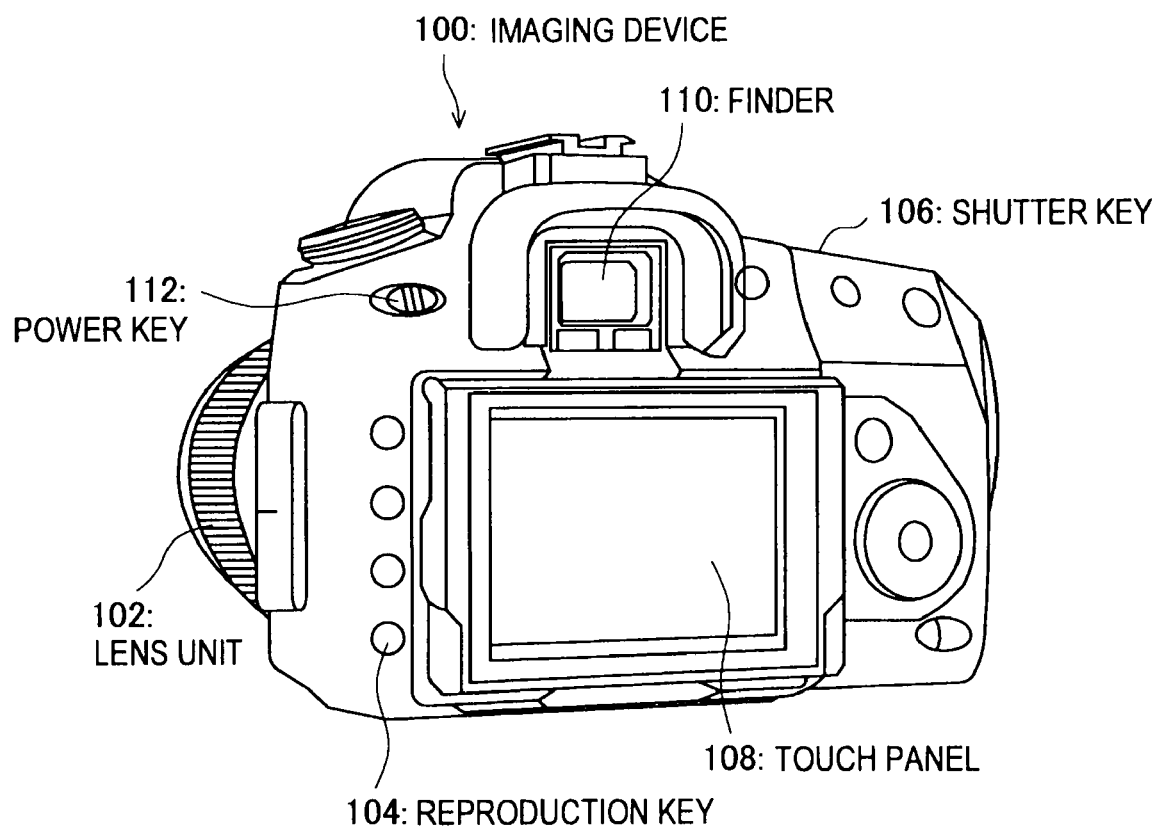
FIG. 1 shows an outer appearance of an imaging device according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description related to the embodiment of the present invention described below will be briefly described. First, the outer appearance of an imaging device 100 according to the present embodiment is shown in FIG. 1, and the device configuration of the imaging device 100 will be schematically described with reference to the drawing. The function configuration of the imaging device 100 will then be described with reference to FIG. 2. The configuration of an actual folder in which the image data are stored in the imaging device 100, the configuration of a virtual folder, and a database structure will be described with reference to FIGS. 3 to 5.

The display control method of an image selection screen by the imaging device 100 will be described with reference to FIGS. 6 and 7. Among them, the transmission method of data by the imaging device 100 will be described in detail with reference to FIG. 7. Furthermore, the configuration of an object handling list managed in the imaging device 100 will be described with reference to FIGS. 8 and 9. The configuration of the transmission frame used when making an acquiring request of the image data will then be described with reference to FIG. 10.

The flow of the control process executed when the power of the imaging device 100 is turned ON will be described with reference to FIG. 11. The flow of the display control process of a category selection screen in the imaging device 100 will be described with reference to FIG. 12. The flow of the display control process in a virtual folder selection screen in the imaging device 100 will be described with reference to FIG. 13. The flow of the display control process of the image selection screen in the imaging device 100 will be described with reference to FIG. 14. The flow of the image registration process to the virtual folder (favorite) in the imaging device 100 will be described with reference to FIG. 15.

The flow of the initialization process executed when the power of the imaging device 100 is turned ON will be described with reference to FIG. 16. The flow of the category selection process in the imaging device 100 will be described with reference to FIG. 17. The flow of the selection process of the virtual folder (favorite) in the imaging device 100 will be described with reference to FIG. 18. The flow of the image registration process to the virtual folder (favorite) in the imaging device 100 will be described with reference to FIG. 19. The operation input steps of the user are implicitly included in the flow of processes shown in FIGS. 16 to 19, and an interactive interaction state between the user and the imaging device 100 is implied.

Lastly, the technical concept of the embodiment will be summarized, and the effects obtained from such technical concept will be briefly described.

<Display of Description Items>
1: Outer appearance of imaging device 100
2: Function configuration of imaging device 100
3: Display control method of image selection screen
4: Flow of control process by imaging device 100
5: Control process and operation input
6: Conclusion Embodiment One embodiment of the present invention will be described. The present embodiment relates to a method of efficiently acquiring the information related to the category of the information related to the images divided into categories in a system for transmitting images using the PTP. In particular, the present embodiment relates to a technique of efficiently acquiring the information of the category and increasing the speed in the display of the information related to the category.

1: OUTER APPEARANCE OF IMAGING DEVICE 100

First, the outer appearance and the device configuration of the imaging device 100 according to the present embodiment will be schematically described with reference to FIG. 1. FIG. 1 is an explanatory view showing the outer appearance of the imaging device 100 according to the present embodiment. The shape of the imaging device 100 shown in FIG. 1 is an example, and the scope in which the technique of the present embodiment is applied is not limited to the device having the outer appearance of FIG. 1.

As shown in FIG. 1, the imaging device 100 mainly includes a lens unit 102, a reproduce key 104, a shutter key 106, a touch panel 108, a finder 110, and a power key 112.

The lens unit 102 configures the optical system of the imaging device 100. The light entered through the lens unit 102 is provided to an imaging element arranged at the interior of the imaging device 100, and then converted to an electrical signal. The image data of a subject image thereby forms by the electrical signal output from the imaging element. The image data of the subject image is recorded in a storage means or a recording media arranged inside the imaging device 100. The recorded image data is displayed on the touch panel 108 by operating the reproduce key 104. That is, the reproduce key 104 is an operation key for switching to a browse mode of the image data. The switching operation of the image data, and the like is carried out using the touch panel 108 or other operation keys.

The shutter key 106 is an operation key used to release the shutter when photographing the subject. For instance, when the shutter key 106 is half-pressed, the focus is adjusted by an auto focus mechanism arranged at the lens unit 102 and the like. When the shutter key 106 is deeply pressed, the shutter is released and the subject image is photographed. As described above, the image data of the subject image is recorded in the storage means or the recording media. The image data of the subject image is displayed on the touch panel 108 by operating the reproduce key 104. In addition to the image data, operation screens and the like are also displayed on the touch panel 108. When the surface is touched with a finger or a stylus, the touch panel 108 detects information of the contacting position, the movement path, and the like.

The finder 110 is a window used to visually recognize the image of the subject seen through the lens unit 102. For instance, the user looks into the finder 110 and checks the imaging range, the focus, and the like, and then presses the shutter key 106 when photographing the subject image. If the imaged image is displayed on the touch panel 108, the user may check the imaged image displayed on the touch panel 108, and operate the shutter key 106. The power key 112 is an operation key for turning ON/OFF the power of the imaging device 100. Therefore, the user first operates the power key 112 when starting photographing.

The outer appearance and the like of the imaging device 100 have been described above. It can be recognized that the imaging device 100 is mounted with a photographing mechanism for photographing the subject. The imaging device 100 also includes the touch panel 108 as a display means of the photographed image data. The imaging device 100 includes the reproduce key 104 and the touch panel 108 as operation means used in the image data selecting operation, reproducing operation, and the like. Furthermore, the imaging device 100 is built with a calculation processing mechanism for processing the image data. The calculation processing mechanism, and the like mounted inside the imaging device 100 will be described below.

2: FUNCTION CONFIGURATION OF IMAGING DEVICE 100

Figure 2:
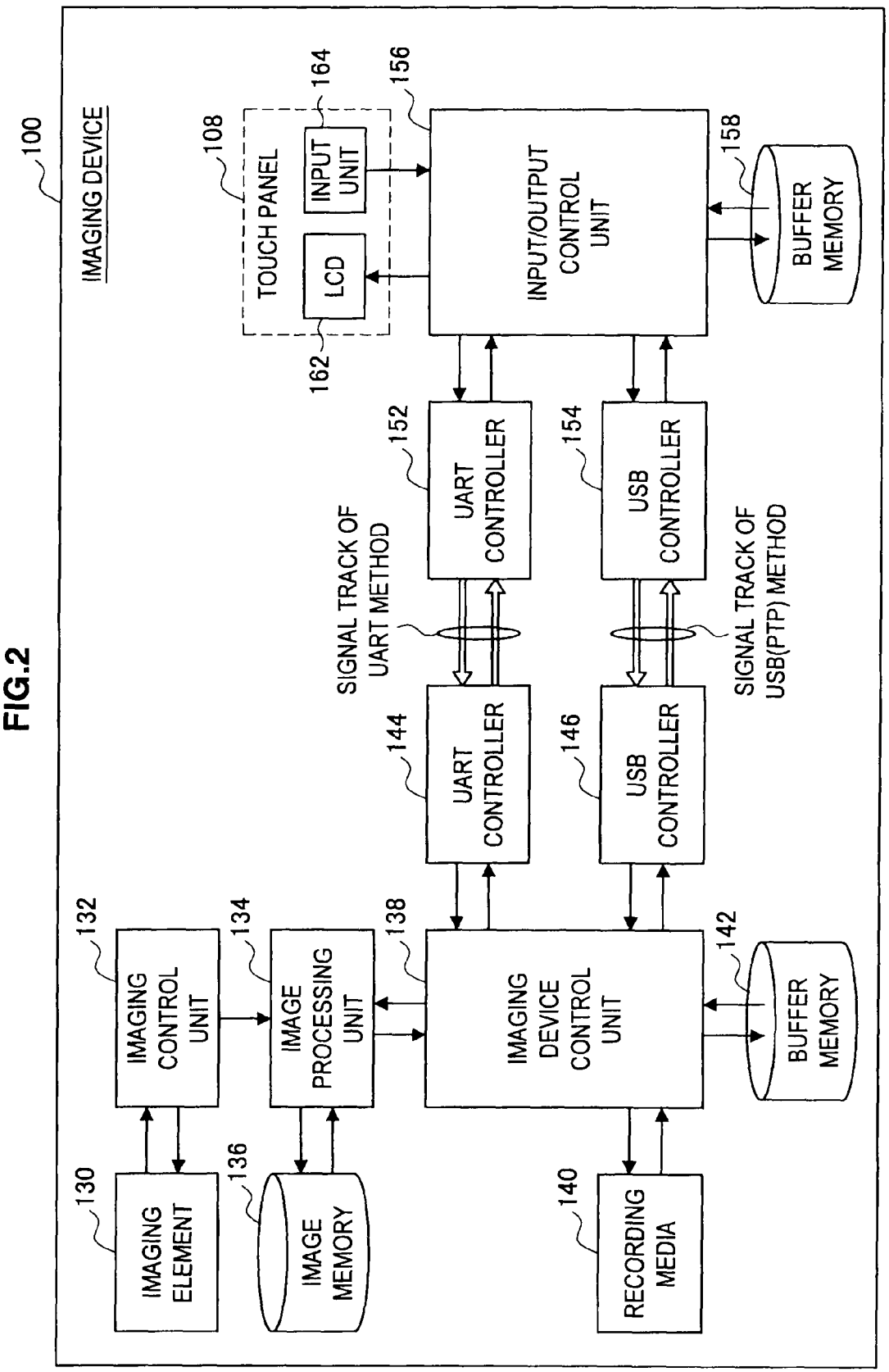
FIG. 2 shows an example of a function configuration of the imaging device according to the embodiment.

First, the function configuration of the imaging device 100 according to the present embodiment will be described first with reference to FIG. 2. FIG. 2 is an explanatory view showing an example of a function configuration of the imaging device 100 according to the present embodiment.

As shown in FIG. 2, the imaging device 100 mainly includes an imaging element 130, an imaging control unit 132, an image processing unit 134, an image memory 136, and an imaging device control unit 138. The imaging device 100 also includes a recording media 140, buffer memories 142, 158, UART controllers 144, 152, USB controllers 146, 154, an input/output control unit 156, and a touch panel 108. The touch panel 108 includes an LCD 162 and an input unit 164. The LCD referred herein is an abbreviation for Liquid Crystal Display. The UART referred herein is an abbreviation of Universal Asynchronous Receiver Transmitter.

First, when the shutter key 106 is pressed, the shutter is released, and the light enters the imaging element 130 through the lens unit 102. The imaging element 130 outputs an electric signal corresponding to the intensity of the incident light. CCD (Charge Coupled Device), CMOS (Complementary Metal Oxide Semiconductor), and the like are used for the imaging element 130. The imaging element 130 is arranged with a plurality of pixel regions, where the intensity of the incident light is detected in the individual pixel region. Thus, the subject image is formed based on the intensity of the electric signal output from each pixel region of the imaging element 130. The electric signal output from the imaging element 130 is input to the imaging control unit 132.

The imaging control unit 132 controls the operation of the lens unit 102, the imaging element 130, and the like, and also digitizes the electric signal input from the imaging element 130 to generate image data. The image data generated by the imaging control unit 132 is input to the image processing unit 134. The image processing unit 134 codes the image data input from the imaging control unit 132 according to a predetermined coding method, or performs compression process on the image data. The predetermined coding method includes GIF, JPEG/JPEG2000, PICT, PING, and the like. In the case of the moving image, the predetermined coding method may be AVI, DV, MPEG, Motion JPEG, and the like. It can be recognized that one or a plurality of methods selected from the above methods or other methods are actually used.

The image processing unit 134 uses the image memory 136 when executing the coding process. For instance, consider the coding process of the image data by the JPEG method. In this case, the image processing unit 134 performs discrete cosine transformation (hereinafter referred to as DCT) on the image data to calculate a DCT coefficient, and performs quantization process and entropy coding process on the DCT coefficient. For instance, the image processing unit 134 holds the original image data in the image memory 136, and calculates the DCT coefficient by reading out each pixel value. The DCT coefficient calculated by the image processing unit 134 is recorded in the image memory 136. The image processing unit 134 then reads out the DCT coefficient from the image memory 136 and quantizes the DCT coefficient, and records the quantized DCT coefficient in the image memory 136. Furthermore, the image processing unit 134 reads out the quantized DCT coefficient from the image memory 136 and performs entropy coding thereon. The image data coded in such manner is input to the imaging device control unit 138.

If, on the other hand, the coded image data is input from the imaging device control unit 138 to the image processing unit 134, the image processing unit 134 decodes the input coded image data. For instance, when the image data coded with the JPEG method is input from the imaging device control unit 138, the image processing unit 134 performs entropy decoding process on the input image data. Furthermore, the image processing unit 134 performs an inverse quantization process on the decoded DCT coefficient, and then executes an inverse discrete cosine transformation (hereinafter referred to as IDCT). Similar to the coding process, the image processing unit 134 uses the image memory 136 in each processing step. The image data decoded by the image processing unit 134 is again input to the imaging device control unit 138. It is to be noted that the decoded image data may not completely match the image data before coding due to influence of quantization error, etc. Obviously, the original image data is completely restored when using other lossless compression methods.

The imaging device control unit 138 records the image data coded by the image processing unit 134 in the recording media 140. When displaying the image data on the touch panel 108, the imaging device control unit 138 reads out the coded image data from the recording media 140, inputs such image data to the image processing unit 134, and decodes the image data. The imaging device control unit 138 then transmits the image data decoded by the image processing unit 134 to the input/output control unit 156, to be hereinafter described, through the USB controllers 146, 154. In this case, the image data decoded by the image processing unit 134 is temporarily recorded in the buffer memory 142.

The imaging device control unit 138 generates a directory stored with the image data when recording the image data in the recording media 140. For instance, the imaging device control unit 138 sequentially stores the image data in a predetermined directory. When a predetermined number of image data are stored in the predetermined directory, the imaging device control unit 138 generates a new directory, and sequentially stores new image data in the new directory. The new directory is sequentially generated in such manner. Thus, a plurality of directories is generated in the recording media 140 as the number of image data increases.

The imaging device control unit 138 also manages the image data based on the imaged date and time, or the attribute given to the image. Furthermore, the imaging device control unit 138 can generate a virtual folder and manage the image data apart from the directory to which the image data are actually stored. In the following description, the above-described directory is sometimes referred to as actual folder, and the virtual folder is sometimes referred to as virtual folder. The virtual folder referred herein means a category that can be arbitrarily set by the user. The virtual folder and the actual folder are common in that both folders group the image data.

For instance, the user generates a virtual folder "favorite", and registers the image data "image 1" in "favorite 1". In this case, the imaging device control unit 138 handles the image data "image 1", which is actually stored in a predetermined actual folder, as if stored in "favorite 1". Actually, however, the address of "image 1" in the recording media 140 is merely corresponded to "favorite 1". Thus, the imaging device control unit 138 manages the image data based on the structure of the actual folder, and manages the image data using the correspondence relationship of the virtual folder and the image data. The information indicating the correspondence relationship is recorded in the recording media 140 by the imaging device control unit 138 at the stage the image data is registered in the virtual folder.

(Regarding Method of Managing Image Data)

Figure 3:
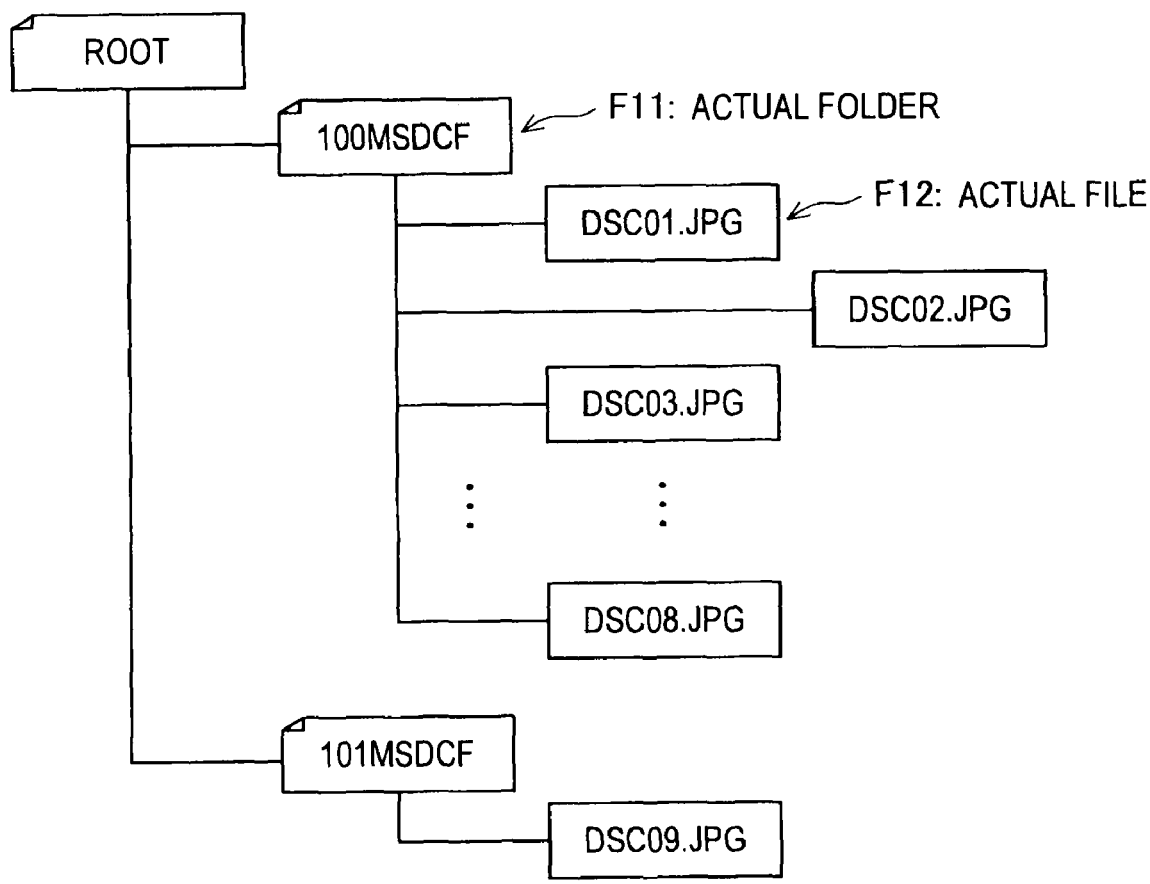
FIG. 3 shows one example of the configuration of a folder according to the embodiment.
Figure 4:
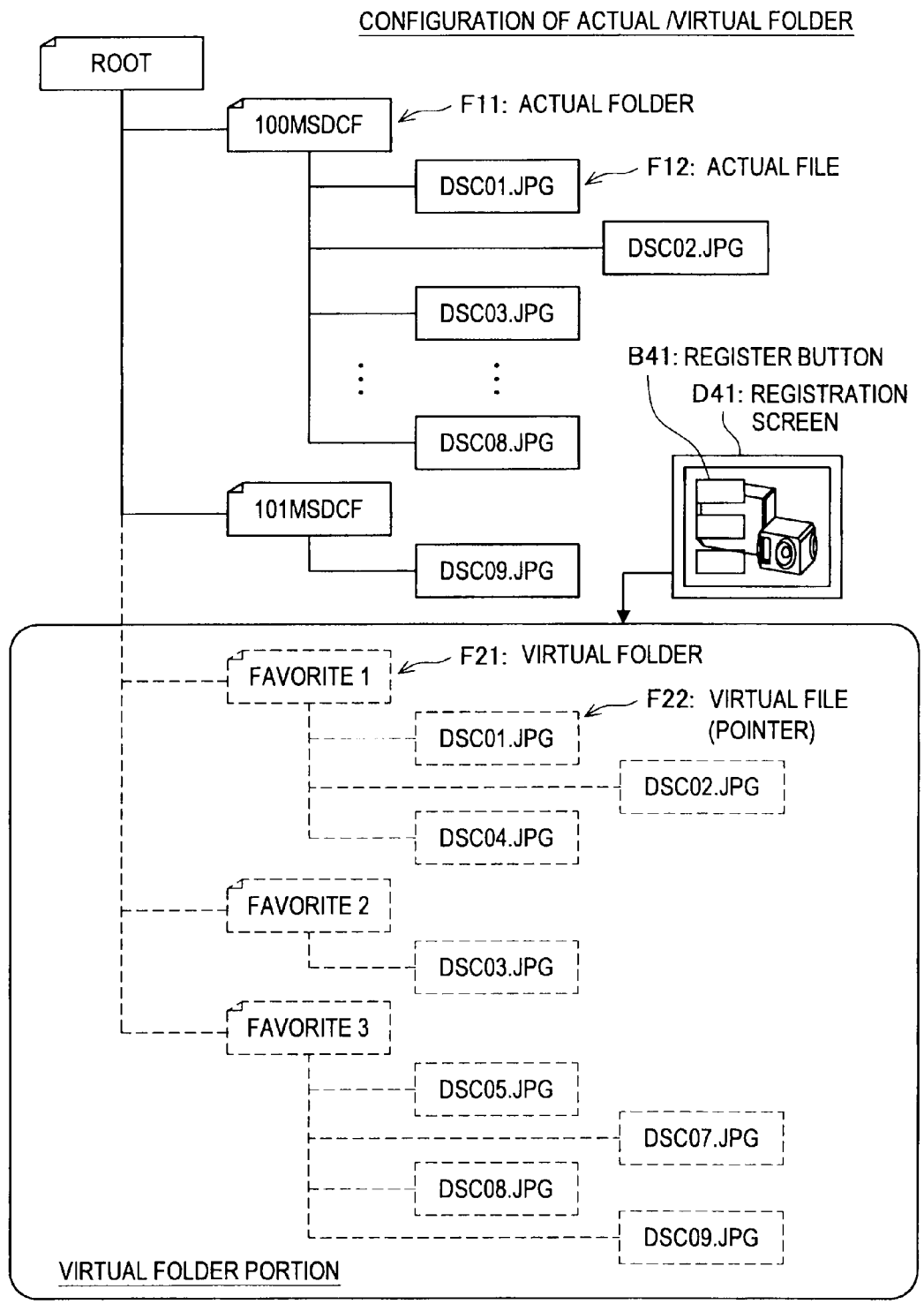
FIG. 4 shows one example of the configuration of a folder according to the embodiment.

The method of managing the image data by the imaging device control unit 138 will be described in detail below using specific examples with reference to FIGS. 3 and 4. FIG. 3 is an explanatory view showing a configuration example of the actual folder. FIG. 4 is an explanatory view showing a folder configuration example of when the virtual folder is generated. The examples of FIGS. 3 and 4 schematically show the folder configuration.

First, FIG. 3 will be referenced. In FIG. 3, two actual folders F11 and nine actual files F12 (partially omitted) are shown by way of example. Specifically, "100MSDCF" and "101MSDCF" are shown for the actual folder F11. "DSC01.JPG" to "DSC09.JPG" are shown for the actual file F12. In the example of FIG. 3, eight actual files F12 are assumed to be stored in one folder. Thus, the ninth actual file F12 ("DSC09.JPG") is not stored in the first actual folder F11 ("100MSDCF"), and is stored in the second actual folder F11 ("101MSDCF").

First, the imaging device control unit 138 stores the image data in the "100MSDCF" in order from "DCF01.JPG", and generates "101MSDCF" at the stage maximum storage number of the actual folder F11 is reached ("DCF08.JPG"). The imaging device control unit 138 stores the "DCF09.JPG" in the newly generated "101MSDCF". The structure of the actual folder as shown in the example of FIG. 3 is formed through the above processes. Furthermore, when the virtual folder F21 is generated by the user, and the actual file F12 is registered, the folder structure as shown in the example of FIG. 4 is formed.

FIG. 4 describes the structure of the virtual folder F21 and the virtual folder formed by the virtual file F22 in addition to the structure of the actual folder shown in FIG. 3. The virtual file F22 is a pointer for specifying the actual file F12. For instance, the virtual file F22 described as "DSC01.JPG" is a pointer for specifying the actual file F12 ("DSC01.JPG"). The virtual file F22 is generated by registering the actual file F12 to the predetermined virtual folder F21. The registration process of the actual filer F12 to the virtual folder F21 is executed in the following manner.

First, a registration screen D41 shown in FIG. 4 is referenced. In the example of FIG. 4, the image data is displayed on the registration screen D41. Furthermore, a register button B41 is displayed on the registration screen D41. For instance, three register buttons B41 displayed as "favorite 1", "favorite 2", and "favorite 3" are displayed on the registration screen D41. Assume the virtual folder F21 corresponding to "favorite 1", "favorite 2", and "favorite 3" is created beforehand by the user. When the register button B41 of "favorite 1" is selected by the user, the image data (e.g., "DSC01.JPG") displayed on the registration screen D41 is registered with respect to the virtual folder F21 of "favorite 1". The user can freely create the virtual folder F21 and register the virtual file F22.

The method of managing the image data by the imaging device control unit 138 has been described above. As described above, the imaging device control unit 138 manages the image data using the virtual folder F21 freely set by the user. Therefore, the image data is managed based on the category freely set by the user independent from the structure of the actual folder F11 automatically generated for every predetermined number. Thus, the user can rapidly find the desired image data even when the number of images is increased as the image data is categorized. Specifically, the categories are presented to the user, so that the user can select the category and rapidly find the desired image data when image data belonging to the selected category are presented.

Figure 5:
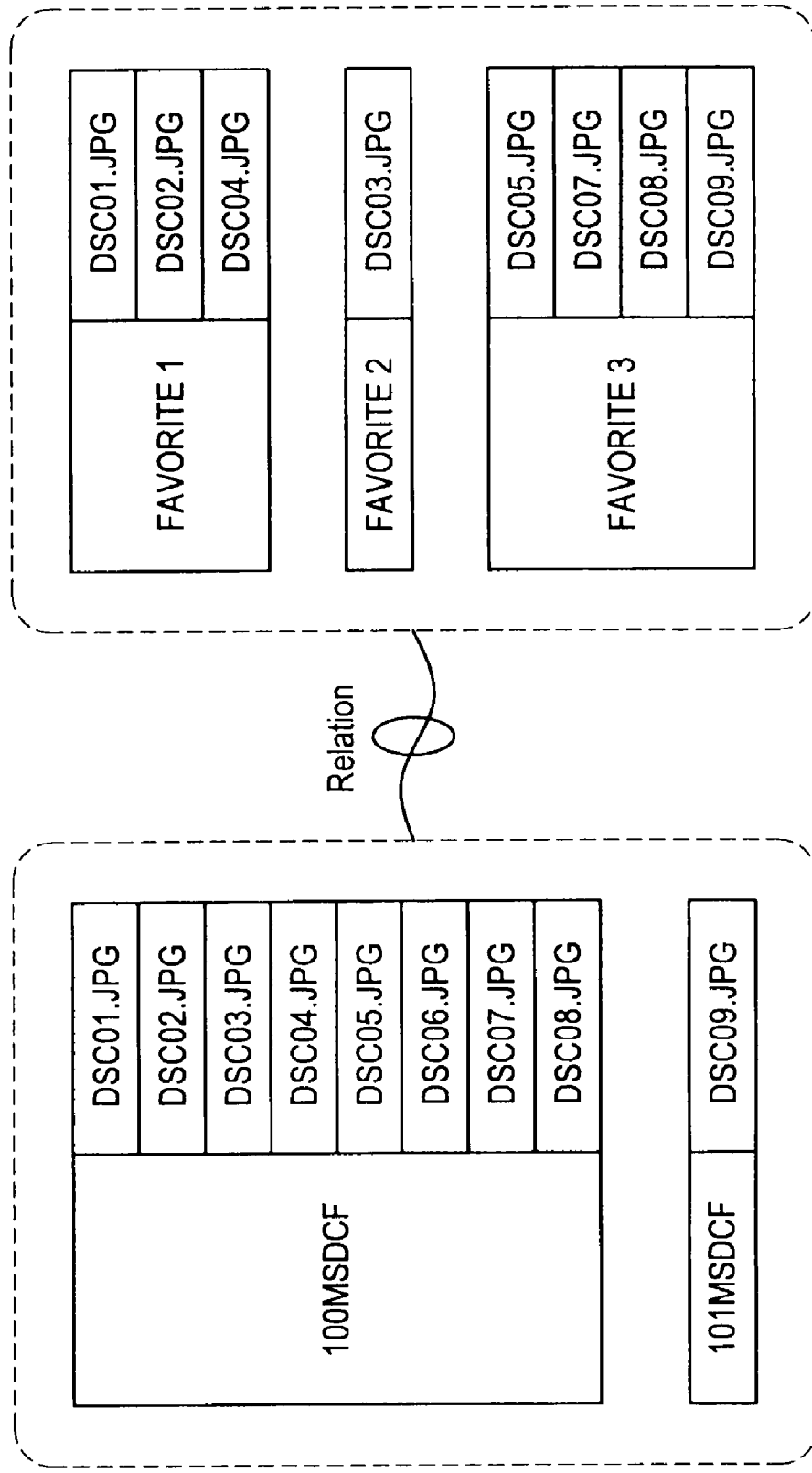
FIG. 5 shows one example of a database structure according to the embodiment.

The folder structure shown in FIG. 4 is managed in the form of database having the structure shown in FIG. 5. That is, the imaging device control unit 138 manages the actual folders, the virtual folders, and the files with the database shown in FIG. 5. For instance, when the power of the imaging device 100 is turned ON, the imaging device control unit 138 builds the database as shown in FIG. 5 based on the information related to the folders and the files recorded in the recording media 140. The imaging device control unit 138 then stores the built database in the buffer memory 142, and appropriately reads out the database from the buffer memory 142 for reference. Such database is preferably built in the form of relational database as shown in FIG. 5 from the standpoint of search process efficiency and management efficiency.

Reference is again made to FIG. 2. As shown in FIG. 2, the imaging device control unit 138 is connected to the UART controller 144 and the USB controller 146. The UART controller 144 is connected to the UART controller 152 by way of a predetermined signal track. Furthermore, the USB controller 146 is connected to the USB controller 154 by way of a predetermined signal track. The signal is transmitted in the UART method (serial transmission method) between the two UART controllers 144, 152. The signal is transmitted between the two USB controllers 146, 154 according to the PTP.

The UART and the PTP will be briefly described below.

(Regarding UART)

The UART is a communication circuit used in serial of PC and the like. More specifically, the UART converts a parallel signal transmitted from a parallel bus of the PC and the like to a serial signal. The UART converts the serial signal transmitted from a peripheral device such as a digital camera and an image scanner to the parallel signal. For instance, the UART controller 144 converts the parallel signal input from the imaging device control unit 138 to the serial signal, and transmits the serial signal to the UART controller 152. The UART controller 152 converts the serial signal transmitted from the UART controller 144 to the parallel signal, and inputs the parallel signal to the input/output control unit 156. The inverse procedure in which the signal is transmitted from the UART controller 152 to the UART controller 144 is similar.

(Regarding PTP)

The PTP is a protocol of the data transfer method used in transferring the image data from the digital camera, the image scanner, and the like to the PC etc. When the device designed according to the PTP is used, the user can easily take the image data into the PC without being conscious of the directory structure of the image data. The user can also easily operate the desired image data from the image data transferred to the PC and the like. For instance, the function related to the display of the thumbnail image is defined in the PTP. Through the use of such function, the PC and the like can easily acquire the thumbnail image from the device designed according to the PTP. Thus, the thumbnail image is presented to the user on the standard basis.

However, the PTP does not define the function of transferring the directory structure of the image data. Thus, the directory structure of the image data is difficult for the PC and the like to acquire from the device designed according to the PTP. When using the PTP, an object handling list indicating the list information of all image data stored in the digital camera and the like is to be acquired for the PC and the like to acquire the number for specifying the image data. That is, in acquiring the image data, the PC and the like specifies the number of the image data described in the object handling list and acquires the image data corresponding to the specified number. However, if the number of images held by the digital camera and the like is large, the data size of the object handling list becomes large, and the acquisition process of the object handling list takes a long time.

The object handling list has the configuration shown in FIG. 8. As shown in FIG. 8, the object handling list is described with an object handle number for specifying the individual object, an attribute of the object, and an object name. In addition to the image data, the folder to which the image data are stored is also included as the object. In the field of the attribute, the information indicating whether the object is a file or whether the object is a folder is described. Therefore, the number of image data described in the object handling list increases in proportion to the number of image data stored in the recording media 140, and the amount of data of the object handling list increases. In a typical PTP framework, information of the virtual folder is not described in the object handling list even if the virtual folder is set.

As briefly described above, various methods that can enhance the convenience of the user when transmitting the image data are obtained by using the PTP. On the contrary, demerits arise when the number of image data becomes large such as the acquisition of the object handling list takes time, and the time for acquiring the image data becomes long. The UART relates to a method of serializing the signal track and transmitting the signal. The data transmitted between two UART controllers 144, 152 is not given a special limitation such as the PTP.

Thus, two types of signal tracks are arranged in the imaging device 100. The technical features of the present embodiment lie in that the signal track (PTP) on which the image data is transmitted and another signal track (UART) are combined to efficiently transmit the information related to the image data. That is, arranging two UART controllers 144, 152 and forming another signal track in addition to the signal track formed between the two USB controllers 146, 154 is one technical feature in the configuration of the imaging device 100. The content and the transmission timing of the data transmitted through such signal tracks will be hereinafter described in detail.

As described above, the serial signal transmitted to the UART controller 152 is converted to the parallel signal and input to the input/output control unit 156. The image data and the like transmitted to the USB controller 154 are also input to the input/output control unit 156. The input/output control unit 156 displays the image data acquired from the imaging device control unit 138 through the two USB controllers 146, 154 on the LCD 162. The input/output control unit 156 acquires the image data or information of the image from the imaging device control unit 138 based on the operation information input from the input portion 164. Furthermore, the input/output control unit 156 displays the image data or the information of the image data acquired from the imaging device 138 on the LCD 162.

The input/output control unit 156 temporarily records the image data or the information of the image data acquired from the imaging device 138 in the buffer memory 158. The input/output control unit 156 reads out the image data or the information of the image data temporarily recorded in the buffer memory 158 and displays the same on the LCD 162. The input/output control unit 156 may have a function of communication with the device exterior to the imaging device 100. For instance, the input/output control unit 156 may be mounted with the function of wirelessly or wired communicating with the external device, and may distribute the image data or the information of the image data to the external device. The input/output control unit 156 may acquire arbitrary data from the external device using the communication function, and display the acquired data on the LCD 162.

As described above, the imaging device 100 is mounted with the imaging device control unit 138 and the input/output control unit 156. That is, the imaging device 100 is mounted with two calculation processing chips. As described above, the imaging device control unit 138 is mainly used in the control of the imaging device, and executes calculation processing related to the acquisition of the image data. The input/output control unit 156 executes display control and calculation processing related to the management of the input information. An advantage in that the imaging device 100 is easily mounted with a variety of functions can be achieved by separating the process related to photographing and other processes. One example of which is the communication function.

If such function is mounted, the user can perform Web browsing using the touch panel 108 arranged in the imaging device 100 or upload the image data directly to the server from the imaging device 100. In addition, the image data can be released to other servers and clients present on the network. Thus, when mounting an additional function different from the imaging function originally provided to the imaging device 100, implementing the additional function with respect to the calculation processing chip for controlling the imaging function is not preferable from the standpoint of design load, manufacturing cost, and the like. That is, the imaging device 100 is inevitably mounted with two calculation processing chips.

The issue thus arises regarding the mechanism for connecting the two calculation processing chips. In the present embodiment, the serial signal track using the UART and the signal track using the USB are adopted for such mechanism.

The transmission of at least the image data is desired for such mechanism, as it connects the two calculation processing chips in the imaging device 100. From such reason, the two calculation processing chips are connected with the USB and the image data and the information of the image data are transmitted according to the PTP. However, when using the PTP, the acquisition process of the object handling list is desired every time the image data or the information of the image data are acquired, which is very inefficient.

The PTP is originally a standard established in view of the data transmission process between the PC and the peripheral device. The PC is mounted with a high-speed calculation processing chip, and can process at high speed even if the amount of data of the object handling list is large. The processes related to the display of the image data, and the like are all executed on the PC. Thus, even if the PC acquires the list of all image data held by the peripheral device as the object handling list when the PC and the peripheral device are connected, and the PC analyzes such list to acquire the image data, the issue of processing time barely arises. The calculation capacity of the calculation processing chip mounted on the imaging device 100 is relatively low. Thus, the issue related to the processing time easily arises.

In particular, the delay of screen transition that occurs from the transfer time of the object handling list leads to lowering of operability, and gives a great uncomfortable feeling to the user. Thus, in the present embodiment, the data transmission method between the imaging device control unit 138 and the input/output control unit 156 is devised to propose a technique of avoiding the delay of screen transition by using the signal track of the UART method and the signal track of the USB method in combination. The data transmission method and the display control method according to the present embodiment will be specifically described below using specific examples by way of example.

3: DISPLAY CONTROL METHOD OF IMAGE SELECTION SCREEN

The display control method of the image selection screen will be described first with reference to FIG. 6. The delay of the screen transition that occurs from the transfer time of the object handling list easily occurs in the transition scene of the selection screen related to the selecting operation of the image data. The data transmission method and the display control method according to the present embodiment will be specifically described using the transition scene of the selection screen used in the selection of the reproducing image by way of example. FIG. 6 is an explanatory view showing the display control method of the image selection screen.

The folder and the file shown in FIG. 4 are assumed to be recorded in the recording media 140. Each display screen is displayed on the touch panel 108 (LCD 162). The display process of each display screen is executed by the input/output control unit 156.

First, when the reproduce key 104 of the imaging device 100 is pressed, a category selection screen D1 is displayed on the screen. The category selection screen D1 is displayed with an actual folder select button B11 and a virtual folder select button B12 (S1). In this case, the input/output control unit 156 holds information related to the presence of the actual folder F11 and the presence of the virtual folder F21. If the virtual folder F21 is not present, the virtual folder select button B12 may not be displayed on the category selection screen D1. The user presses the actual folder select button B11 or the virtual folder select button B12. In the description, the expression "press" the button is used, but it can be recognized that this actually sometimes means the contacting operation with respect to the touch panel 108.

(When "Favorite" is Selected)

For instance, when the virtual folder select button B12 is pressed, the input/output control unit 156 transitions the screen display to the virtual folder selection screen D21 (S2). The virtual folder selection screen D21 is displayed with the virtual folder select button B21 for selecting "favorite 1", "favorite 2", and "favorite 3" registered as the virtual folder F21. In this case, the input/output control unit 156 acquires the number of virtual folders F21 recorded in the recording media 140, and displays the virtual folder select button B21 by such number.

In the framework of the PTP, the object handling list is to be acquired to acquire the number of virtual folders F21. Thus, when attempting to realize the screen transition from the category selection screen D1 to the virtual folder selection screen D21 in the framework of the prior and existing PTP, such screen transition tends to greatly delay. Thus, in the present embodiment, a method of avoiding such delay is proposed. This method will be described in detail in the post-stage with reference to FIG. 7.

When one virtual folder select button B21 ("favorite 1") is pressed on the virtual folder selection screen D21, the input/output control unit 156 transitions the screen display to the image selection screen D31 (S3). The image selection screen D31 is displayed with image select buttons B31 corresponding to "image 1", "image 2", and "image 4" registered in the "favorite 1". In this case, the input/output control unit 156 acquires the number of actual files F12 corresponded to each virtual folder F21. For instance, the input/output control unit 156 acquires the number of actual files F12 corresponded to each virtual folder F21 at the stage the virtual folder select button B21 is pressed on the virtual folder selection screen D21.

The input/output control unit 156 estimates the object handling list based on the number of actual files F12 registered in the individual virtual folder F21, and acquires the thumbnail image to be displayed on the image selection screen D31 based on the configuration of the object handling list. The input/output control unit 156 may not acquire the thumbnail images of all the actual files F12. For instance, the input/output control unit 156 acquires the thumbnail image corresponding to the actual file F12 of the virtual folder F21 selected in the virtual folder selection screen D21, and displays the same as the image select button B31 in the image selection screen D31.

The input/output control unit 156 may be configured to acquire the thumbnail image corresponding to the actual file F12 of the next virtual folder F21 when the number of actual files F12 of the virtual folder F21 selected in the virtual folder selection screen D21 is smaller than a predetermined number. The predetermined number is set as the number of the image select buttons B31 that can be displayed on the image selection screen D31. That is, the thumbnail image corresponding to the actual file F12 is sequentially acquired for every virtual folder F21 according to the displayable number of image select buttons B31.

Figure 6:
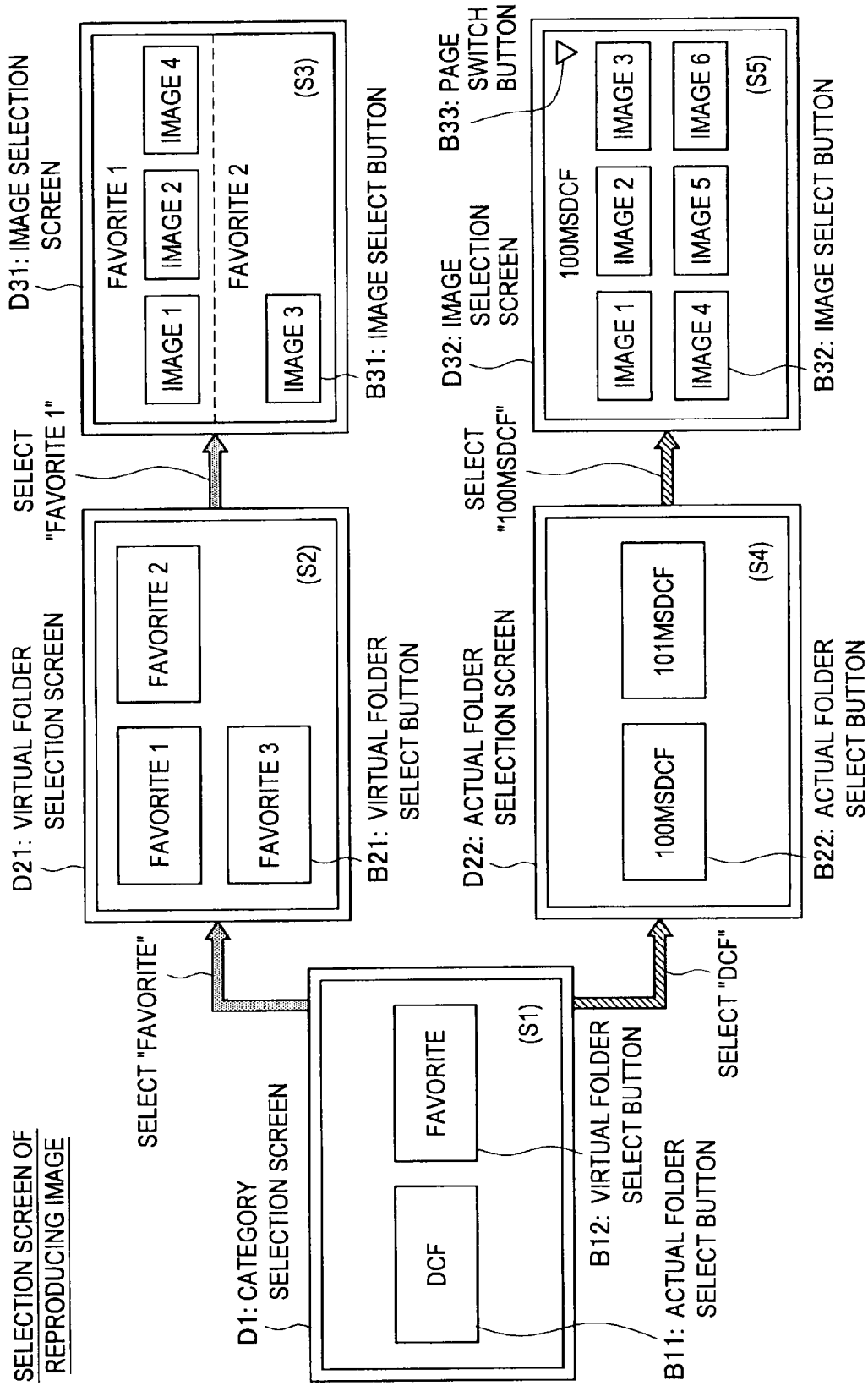
FIG. 6 shows a transition process of an image selection screen according to the embodiment.
Figure 7:
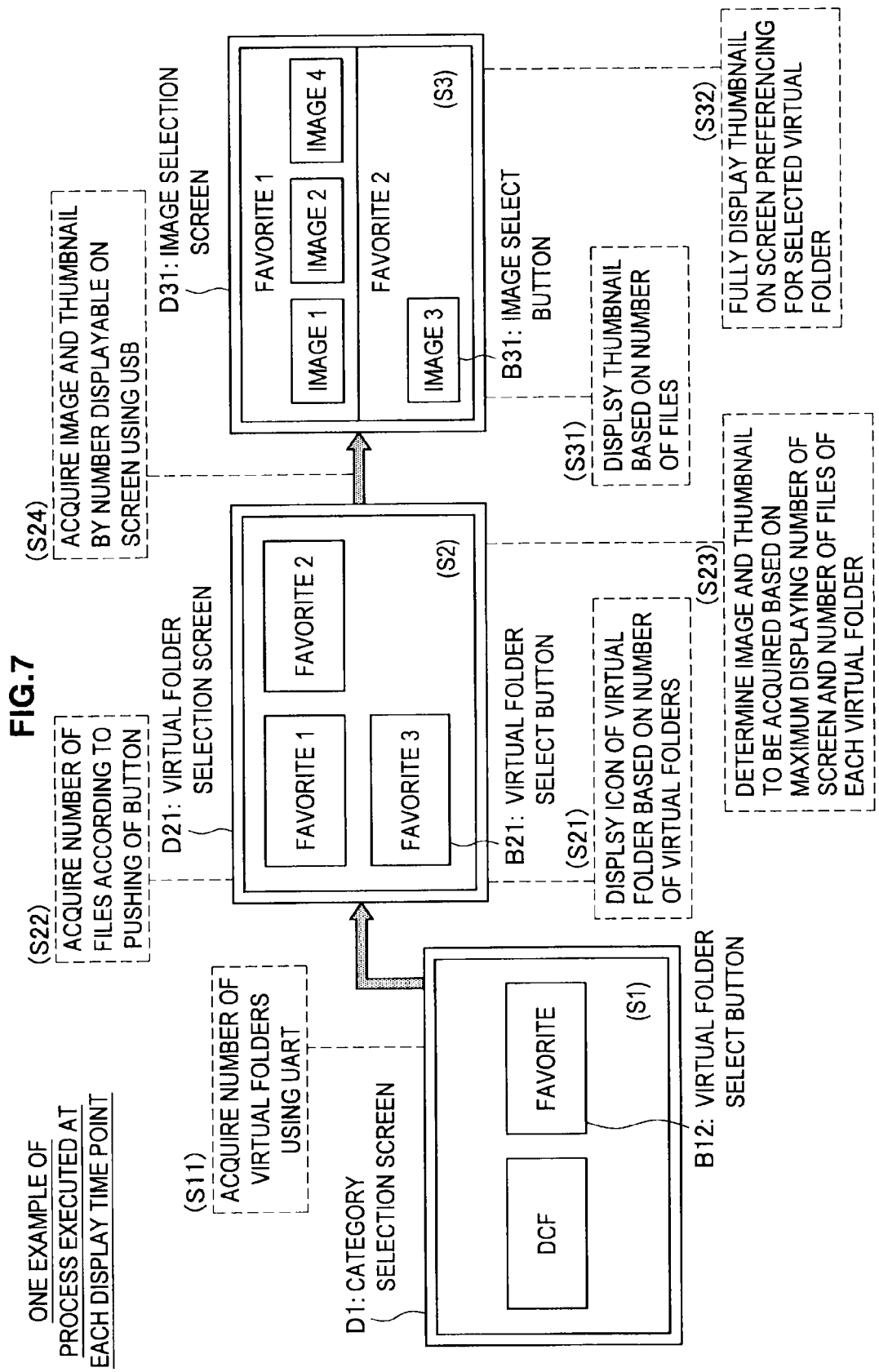
FIG. 7 shows a transition process of an image selection screen according to the embodiment.

As shown in FIG. 6, when displaying the image select button B31 corresponding to a plurality of virtual folders F21, the image select button B31 is displayed such that each virtual folder F21 can be distinguished. According to such display, the user can easily find and select the desired image data. When the image select button B31 is selected in the image selection screen D31, the image data corresponding to such image select button B31 is displayed on the screen.

(When "DCF" is Selected)

When the actual folder select button B11 is pressed on the category selection screen D1, the input/output control unit 156 transitions the screen display to the actual folder selection screen D22 (S4). The actual folder selection screen D22 is displayed with an actual folder select button B22 corresponding to "100MSDCF", "101MSDCF" registered as the actual folder F11. In this case, the input/output control unit 156 acquires the number of actual folders F11 recorded in the recording media 140, and displays the actual folder select button B22 by such number.

However, in the framework of the PTP, the object handling list is to be acquired to acquire the number of actual folders F11. Thus, the screen transition delays when attempting to realize the screen transition from the category selection screen D1 to the actual folder selection screen D2 in the framework of the prior and existing PTP. A method of avoiding such delay is thus proposed in the present embodiment. This method will be specifically described with reference to FIG. 7 in the post-stage.

When one actual folder select button B22 ("100MSDCF") is pressed on the actual folder selection screen D22, the input/output control unit 156 transitions the screen display to the image selection screen D32 (S5). The image selection screen D32 is displayed with image select buttons B32 corresponding to "image 1", "image 2", "image 3", "image 4", "image 5", and "image 6" stored in the "100MSDCF". In this case, the input/output control unit 156 acquires the number of actual files F12 stored in each actual folder F11. For instance, the input/output control unit 156 acquires the number of actual files F12 stored in each actual folder F11 at the stage the actual folder select button B22 is pressed on the actual folder selection screen D22.

As shown in FIG. 4, the number of actual files F12 stored in "100MSDCF" is eight in the example of FIG. 6. In the example, the number of image select buttons B32 that can be displayed on the screen (hereinafter referred to as displayable number) is limited to six. Thus, the image select buttons B32 corresponding to all actual files F12 stored in "100MSDCF" are not displayed on the image selection screen D32. A page switch button B33 is displayed on the image selection screen D32. The page switch button B33 is displayed when the number of actual files F12 in the actual folder F11 selected in the actual folder selection screen D22 is greater than the displayable number. When the page switch button B33 is pressed, the image select buttons B32 corresponding to the remaining actual files F12 are displayed. When the image select button B32 is pressed, the image data corresponding to such image select button B32 is displayed on the screen.

The input/output control unit 156 estimates the object handling list based on the number of actual files F12 stored in the individual virtual folder F11, and acquires the thumbnail image to be displayed on the image selection screen D32 based on the configuration of the object handling list. The input/output control unit 156 may not acquire the thumbnail images of all the actual files F12. For instance, the input/output control unit 156 acquires the thumbnail image corresponding to the actual file F12 of the actual folder F11 selected in the actual folder selection screen D22, and displays the same as the image select button B32 in the image selection screen D32.

The input/output control unit 156 may be configured to acquire the thumbnail image corresponding to the actual file F12 of the next actual folder F11 when the number of actual files F12 of the actual folder F11 selected in the actual folder selection screen D22 is smaller than a predetermined number. The predetermined number is set as the number of the image select buttons B32 that can be displayed on the image selection screen D32. That is, the thumbnail image corresponding to the actual file F12 is sequentially acquired for every actual folder F11 according to the displayable number of image select buttons B32.

The display control method by the input/output control unit 156 and the transition of the image selection screen have been described above. The data transmission method between the imaging device control unit 138 and the input/output control unit 156 executed according to the timing of screen transition or the operation timing of various types of buttons will be described with reference to FIG. 7. FIG. 7 is an explanatory view showing the content of data transmission process executed at each display point. In the example of FIG. 7, only a case in which the virtual folder select button B12 is pressed on the category selection screen D1 is shown, but similar process is executed for a case in which the actual folder select button B11 is selected.

(Details of Data Transmission Process)

First, when the virtual folder select button B12 is pressed on the category selection screen D1, the input/output control unit 156 acquires the number of virtual folders F21 through the signal track of the UART method (S11). As described above, acquisition of the object handling list is necessary when the PTP is used, and thus the signal track of the UART method is used. More specifically, the input/output control unit 156 requests the imaging device control unit 138 to notify of the number of virtual folders F21 through the signal track of the UART method. In response to such request, the imaging device control unit 128 notifies the input/output control unit 156 of the number of virtual folders F21 through the signal track of the UART method.

The information notified to the input/output control unit 156 is only the "number" of virtual folders F21. Therefore, the time for the transmission of data is short by the lesser amount of data even if the bandwidth of the signal track of the UART method is narrow. When the number of virtual folders F21 is notified to the input/output control unit 156, the input/output control unit 156 displays the virtual folder select button B21 (icon) on the LCD 162 by the notified number (S21). According to such configuration, the transmission time of data is greatly shortened compared to when acquiring the object handling list, and the speed of screen transition from the category selection screen D1 to the virtual folder selection screen D21 is greatly increased.

When the virtual folder select button B21 is pressed on the virtual folder selection screen D21, the input/output control unit 156 acquires the number of actual files F12 registered in the individual virtual folder F21 (S22). In this case, the input/output control unit 156 requests the imaging device control unit 138 to notify of the number of actual files F12 through the signal track of the UART method. In response to such request, the imaging device control unit 128 notifies the input/output control unit 156 of the number of actual files F12 corresponding to each virtual folder F21 through the signal track of the UART method.

The number of actual files F12 corresponding to each virtual folder F21 may be acquired when the virtual folder select button B12 is pressed on the category selection screen D1. However, as in the example shown in FIG. 7, each screen transition is completed with a predetermined time by distributing the timing of acquiring the number of virtual folders F21 and the timing of acquiring the number of actual files F12.

When the number of virtual folders F21 and the number of actual files F12 are acquired at the same timing, the speed of the screen transition without the acquisition process of the number information is increased, but the screen transition including such acquisition process takes a long time. Normally, the user does not feel stress if the screen transition is completed within the predetermined time. Thus, all screen transitions are desirably completed within the predetermined time rather than the speed of the screen transition of one part being extremely increased. That is, distributing the timing of acquiring the number information is more preferable.

When acquiring the number of actual files F12 registered in each virtual folder F21, the input/output control unit 156 determines the thumbnail to acquire from the imaging device control unit 138 based on the displayable number of image select buttons B31 in the image selection screen D31 (S23). When acquiring the image data before displaying the image selection screen D31, the input/output control unit 156 also determines the image to acquire from the imaging device control unit 138.

For instance, assume the virtual select button B21 of "favorite 1" is pressed in this case, the input/output control unit 156 acquires the number (three) of actual files F12 registered in at least "favorite 1". Since the number of image select buttons B31 displayable on the image selection screen D31 is six, a blank region is greatly included in the image selection screen D31 with only the image select button B31 corresponding to "favorite 1". The input/output control unit 156 acquires the number (one) of actual file F12 registered in "favorite 2". The image selection screen D31 can be approximately filled by adding the number of actual files F12 registered in "favorite 1" and the number of actual files F12 registered in "favorite 2". If a blank region is greatly included in the image selection screen D31, similar process is executed on "favorite 3".

Thus, the blank region included in the image selection screen D31 can be reduced by displaying the image select button B31 corresponding to "favorite 2", and the like. The type and number of the image select buttons B31 to display on the image selection screen D31 can be determined in the above manner. That is, the image data and the thumbnail image to be acquired from the imaging device control unit 138 are determined. The input/output control unit 156 then acquires all actual files F12 registered in "favorite 1" and "favorite 2" and the thumbnail image corresponding to each actual file F12 from the imaging device control unit 138 through the signal track of the USB method (S24). If the actual files F12 greater in number than the displayable number is registered in "favorite 1", the input/output control unit 156 acquires the actual file F12 and the thumbnail image by the displayable number.

When acquiring the actual file F12 and the thumbnail image from the imaging device control unit 138, the input/output control unit 156 displays the image select button B31 on the LCD 162 for "favorite 1" and "favorite 2" (S31). In this case, the input/output control unit 156 displays the image select button B31 based on the number of actual files F12 registered in "favorite 1" and "favorite 2", respectively. The input/output control unit 156 also displays the thumbnail acquired from the imaging device control unit 138 as each image select button B31. Since the number of thumbnails to be displayed (number of image select buttons B31) is determined so that great amount of blank region is not included in the image selection screen D31 as described above, the thumbnail image is displayed on the image selection screen D31 without waste. The "favorite 1" selected in the virtual folder selection screen D21 is preferentially displayed (S32). For instance, "favorite 1" is displayed at high order in the order of high priority.

The data transmission method between the imaging device control unit 138 and the input/output control unit 156 has been described above along the transition process of the image selection screen. In the present embodiment, the number of virtual folders F21 or the number of actual folders F11 is acquired through the signal track of the UART method, and the select button is displayed based on such numbers. As a result, the screen transition can be carried out without acquiring the object handling list in the transition process of the image selection screen, and the speed of screen transition related to category and image selection can be significantly increased.

(Regarding Configuration of Object Handling List Including Virtual Folder)

The configuration of the general object handling list has been briefly described with reference to FIG. 8. However, the general object handling list shown in FIG. 8 does not contain information related to the virtual folder F21. If the information related to the virtual folder F21 is to be contained in the object handling list, the object handling list will be as shown in FIG. 9. The object handling list of FIG. 9 contains the portion related to the actual folder F11 and the portion related to the virtual folder F21. The portion related to the actual folder F11 is substantially the same as the object handling list shown in FIG. 8, and thus the description will be omitted, and the portion related to the virtual folder F21 will be focused.

The portion related to the virtual folder F21 is described with the virtual folder F21 as the object. That is, the concept of the object is extended to the virtual folder F21. Furthermore, the actual file F21 registered in the virtual folder F21 is described. It is to be noted that "the actual file F12 registered in the virtual folder F21 is already described in the object handling list as the actual file F12 stored in the actual folder F11". That is, if the concept of the object is extended to the virtual folder F21, the size of the object handling list has a possibility of becoming significantly large.

For instance, "favorite 1" is registered with "DSC01.JPG", "DSC02.JPG", "DSC04.JPG". However, "DSC01.JPG", "DSC02.JPG", "DSC04.JPG" are described in the portion related to the actual folder F11 as the file stored in "100MSDCF". The "DSC01.JPG" and the like described in the actual folder portion and the "DSC01.JPG" and the like described in the virtual folder portion are denoted with different object handle number. Thus, if the information related to the virtual folder F21 is contained, redundant information is independently described in the object handling list, and the amount of data increases by such amount. In the example of FIG. 9, the actual folder portion is 12 lines including "ROOT", whereas the virtual folder portion is 11 lines, and thus the data amount is about two times.

As described above, in handling the categorized image data, the information related to the virtual folder F21 is assumed to be used in view of the convenience of the user. If the information related to the virtual folder F21 is to be used by extending the current PTP framework, the configuration of the object handling list as shown in FIG. 9 is necessary. In this case, the transmission frequency of the object handling list may reduce, and the transmission timing may be controlled. In such case, the technique of the present embodiment exhibits a significantly large effect.

(Regarding Configuration of Image Data Acquiring Frame)

In relation to the method of acquiring the image data, the configuration of the image data acquiring frame will be described with reference to FIG. 10. FIG. 10 is an explanatory view showing a configuration example of the image data acquiring frame. The image data acquiring frame shown in FIG. 10 is transmitted from the input/output control unit 156 to the imaging device 138 through the signal track of USB method when the image select button B31 is pressed on the image selection screen D31.

As shown in FIG. 10, the image data acquiring frame contains a folder number, a file number in the folder, a folder attribute, and a file attribute.

The folder number contained in the image data acquiring frame is an identification number used to specify each folder. The file number in the folder is an identification number used to specify the file in the folder indicated by the folder number. For instance, when the folder number is 1 and the file number is 4, the fourth file is specified of the files registered in the folder of the folder number 1. The file number 0 indicates the folder. Thus, the search range of the file is limited to a specific folder by specifying both the folder number and the file number, and the speed of the search process of the file is increased. Since the virtual folder F21 can be specified with the folder number, and thus the virtual folder F21 can be handled same as the actual folder F11.

The folder attribute contained in the image data acquiring frame is the identification information for specifying the attribute of the folder. For instance, the folder having the folder attribute 0 is "ROOT". The folder having the folder attribute 1 is "DCF". The folder having the folder attribute 2 is "favorite". That is, whether the folder specified with the folder number is ROOT, actual folder F11, or virtual folder F21 is identified based on the folder attribute. Thus, when searching for the folder specified with the folder number by specifying the attribute of the folder, the search target is narrowed to the folder having the specified attribute.

As shown in FIG. 9, the object handle number denoted with "01" for the first two digits is assigned to the object of the actual folder portion. The object handle number denoted with "02" for the first two digits is assigned to the object of the virtual folder portion. Therefore, when the virtual folder F21 ("favorite") is specified with the folder attribute, the specified folder is searched from the objects having "02" for the first two digits of the object handle number. Thus, in the example of FIG. 9, the search target of the specified folder is narrowed to about half. As a result, the time for searching the folder specified with the folder number is greatly reduced.

The file attribute contained in the image data acquiring frame is the identification information for identifying the attribute of the file specified with the folder number and the file number. For instance, the file having the file attribute 0 is "still image" file. The file having the file attribute 1 is "moving image" file. The file having file attribute 2 is "others (text, memo, audio, etc.)" file. That is, the attribute of the file specified with the folder number and the file number is identified by referencing the file attribute.

In the above description, the image data has been described as an example of the transmission target, but the application range of the technique according to the present embodiment is not limited thereto. For instance, character information, audio data, etc. may be recorded in the recording media 140. In such case as well, the input/output control unit 156 can acquire the data from the imaging device control unit 138 through the data transmission method similar to above. In this case, the file attribute contained in the image data acquiring frame is used. When the "moving image" is specified for the file attribute, the search range of the file specified with the file number is limited to "moving image". As a result, the number of search objects reduces, and the speed of the search process increases. The file attribute is distinguished based on the extension etc. given to each file. Specifically, the file of the search target is narrowed down with the extension corresponding to the file attribute described in the image data acquiring frame, and the file adapted to the folder number is extracted therefrom.

The display method of the image selection screen has been described above with the function configuration of the imaging device 100. As described above, the technique of the present embodiment relates to a method of connecting two calculation processing chips arranged in the imaging device 100 with the signal track of the USB method and the signal track of the UART method, and efficiently transmitting data by combining both signal tracks. In particular, the characteristics lies in that a mechanism that does not acquire the object handling list of large amount of data when displaying categories, groups, and the like on the selection screen of the image data is arranged.

According to such characteristics, the display speed in displaying the categories, groups, and the like can be increased as the object handling list is not acquired. When the number of image data increases, the amount of data of the object handling list increases in proportion to such number, and thus the effects obtained by applying the technique of the present embodiment are great when the number of image data is large. As shown in FIG. 9, when the virtual folder F21 such as "favorite" is registered, the amount of data of the object handling list doubles. The registration function of the virtual folder F21 that allows the user to freely set the categorization or the grouping is considered an important function for the imaging device 100. Thus, even if the amount of data of the object handling list is increased, the technique of the present embodiment that can increase the screen update speed irrespective of the amount of data has a very important meaning.

4: FLOW OF CONTROL PROCESS BY IMAGING DEVICE 100

The flow of the control process by the imaging device 100 will now be described with reference to FIGS. 11 to 15. The timing of the data transmission carried out between the imaging device control unit 138 and the input/output control unit 156 mounted on the imaging device 100 and the timing of the calculation processing by each unit will be described in detail.

(Regarding Control Process after Power ON)

First, the control process after power ON in the imaging device 100 will be described with reference to FIG. 11. FIG.

11 is an explanatory view showing the flow of process executed from when the power key 112 of the imaging device 100 is operated and the power is turned ON until the database as shown in FIG. 5 is built.

Figure 11:
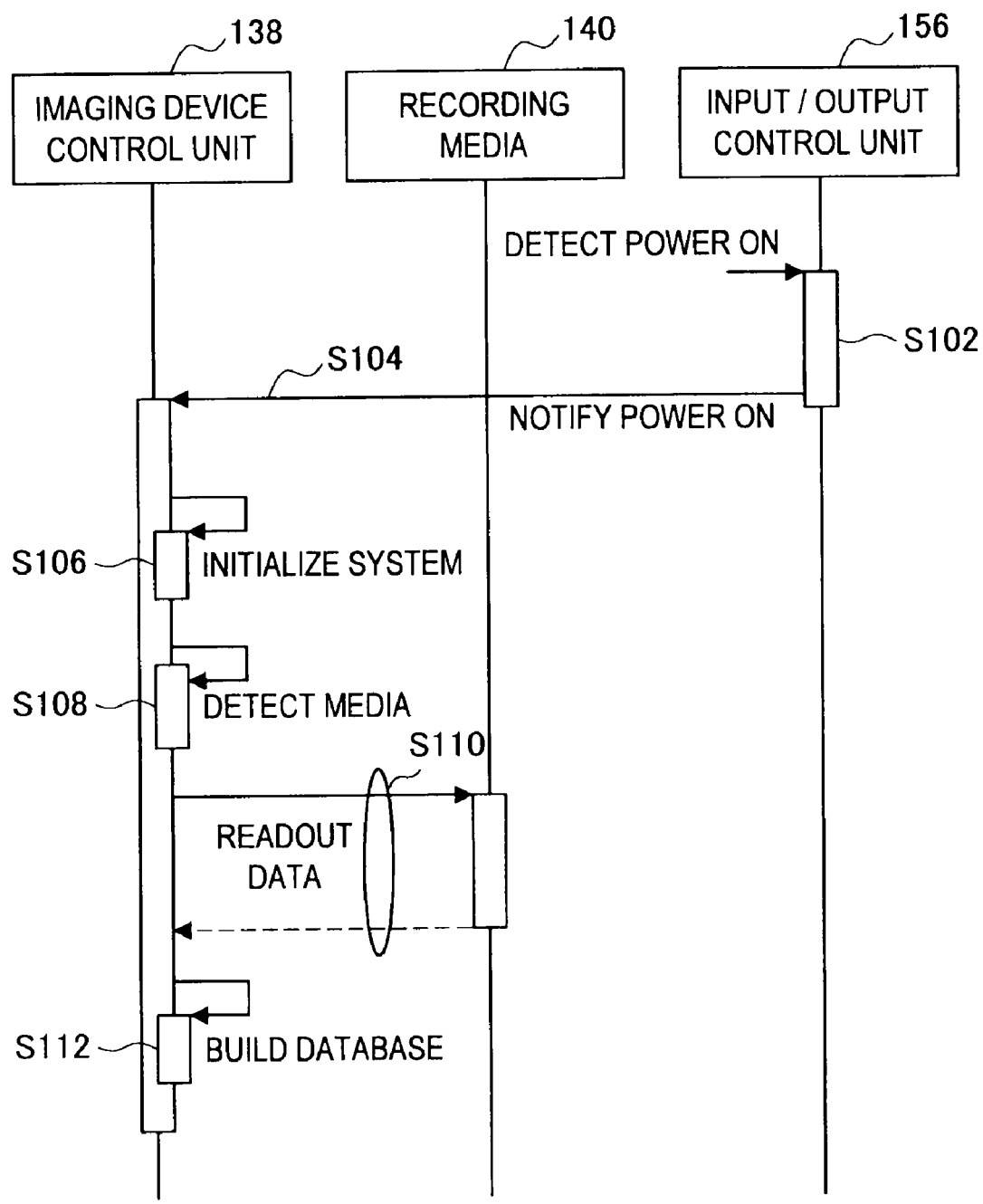
FIG. 11 shows one example of the control process related to the data transmission method of the embodiment.

As shown in FIG. 11, when the power ON is detected by the input/output control unit 156 (S102), the power ON notification is transmitted from the input/output control unit 156 to the imaging device control unit 138 (S104). The power ON notification referred herein is a notification signal for notifying operation of the power key 112 to the power ON position and transition of the power of the imaging device 100 to the ON state. The power ON notification is transmitted through the signal track of the UART method. When the power ON notification is transmitted from the input/output control unit 156 to the imaging device control unit 138, the imaging device control unit 138 executes the initialization process of the system (S106). The initialization process executed here is the process of initializing the setting of the lens unit 102, the imaging element 130, and the like.

When the initialization process of the system is completed in the imaging device control unit 138, the imaging device control unit 138 attempts to detect the recording media 140 connected to the imaging device 100 (S108). If the recording media 140 is detected, the imaging device control unit 138 reads out data from the recording media 140 (S110). In this case, the imaging device control unit 138 acquires the information of the actual folder F11 and the information of the virtual folder F21 in addition to the image data recorded in the recording media 140. The imaging device control unit 138 may also acquire information indicating the correspondence relationship between each image data and the actual folder F11 and the virtual folder F21. The imaging device control unit 138 then builds the database as shown in FIG. 5 based on the information acquired from the recording media 140 (S112), and records the same in the buffer memory 142.

The flow of process executed from when the power of the imaging device 100 is turned ON until the database related to the image data as shown in FIG. 5 is built has been described above.

(Regarding Display Control Process of Category Selection Screen)

Figure 12:
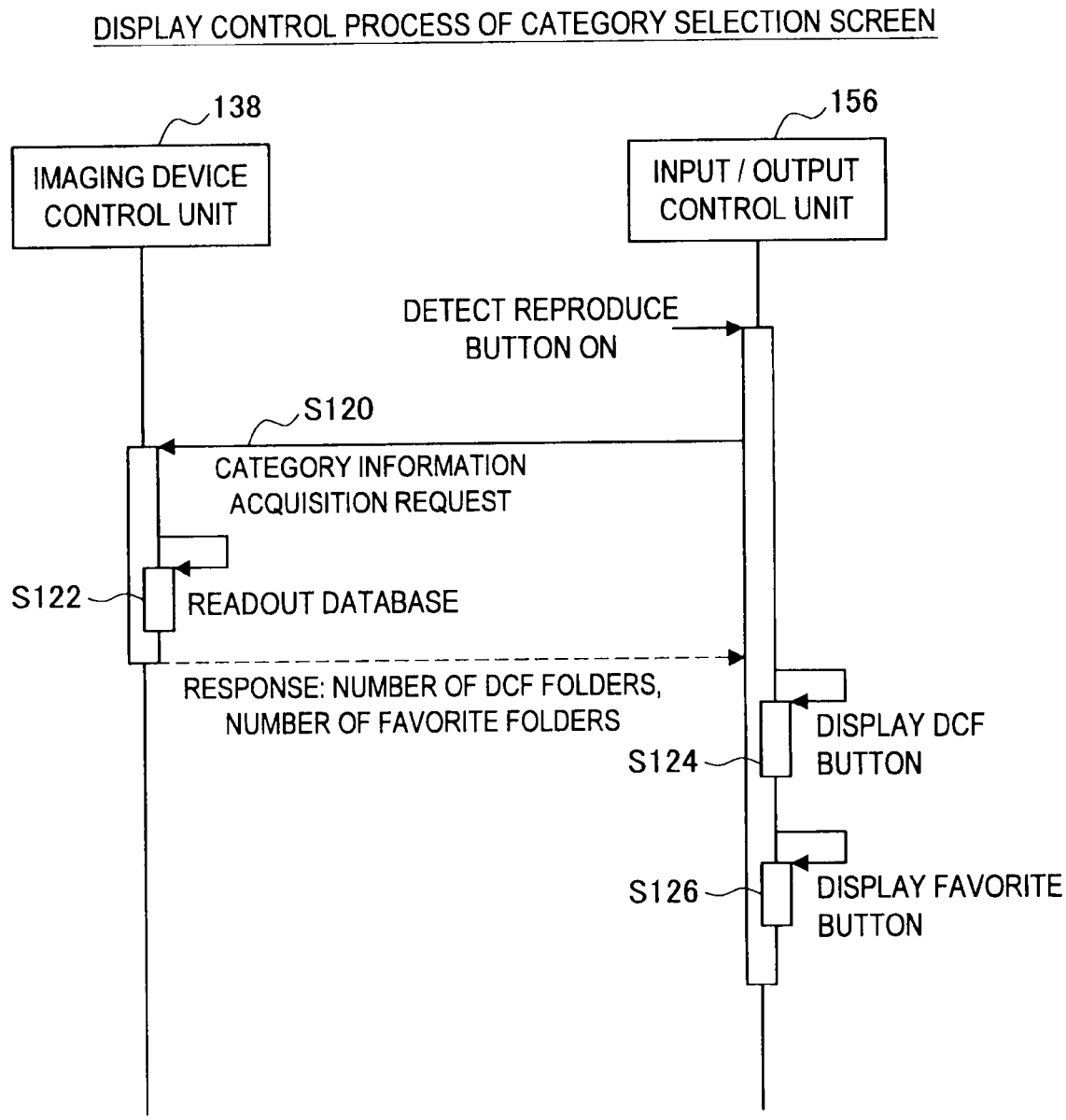
FIG. 12 shows one example of the control process related to the data transmission method of the embodiment.

The display control process of the category selection screen in the imaging device 100 will be described with reference to FIG. 12. FIG. 12 is an explanatory view showing the flow of process executed from when the reproduce key 104 of the imaging device 100 is operated to transition to the reproduction mode of the image data until the category selection screen D1 of FIG. 6 is displayed.

As shown in FIG. 12, when the reproduce button ON (operation of reproduce key 104) is detected by the input/output control unit 156, a category information acquiring request is transmitted from the input/output control unit 156 to the imaging device control unit 138 (S120). The category information acquiring request is a request signal for requesting the imaging device control nit 1 to notify of the number of actual folders F11 and the number of virtual folders F21. The category information acquiring request is transmitted through the signal track of the UART method.

When the category information acquiring request is transmitted from the input/output control unit 156 to the imaging device control unit 138, the imaging device control unit 138 reads out the database built in advance from the buffer memory 142 (S122). Furthermore, the imaging device control unit 138 references the read database and detects the number of actual folders F11 ("DCF") and the number of virtual folders F21 ("favorite") (hereinafter referred to as number of folder information) and transmits the same to the input/output control unit 156. In this case, the number of folder information is transmitted to the input/output control unit 156 through the signal track of the UART method.

When the number of folder information is transmitted from the imaging device control unit 138 to the input/output control unit 156, the input/output control unit 156 displays the category selection screen D1 on the LCD 162 based on the number of folder information. In this case, the input/output control unit 156 determines whether or not the number of actual folders F11 contained in the number of folder information is zero, and displays the actual folder select button B11 ("DCF" button) if the number of actual folders F11 is not zero (S124). Similarly, the input/output control unit 156 determines whether or not the number of virtual folders F21 contained in the number of folder information is zero, and displays the virtual folder select button B12 ("favorite" button) if the number of virtual folders F21 is not zero (S126).

The flow of process executed from when the image data reproduction mode of the imaging device 100 is turned ON until the category selection screen D1 is displayed has been described above.

(Regarding Display Control Process of Virtual Folder Selection Screen)

Figure 13:
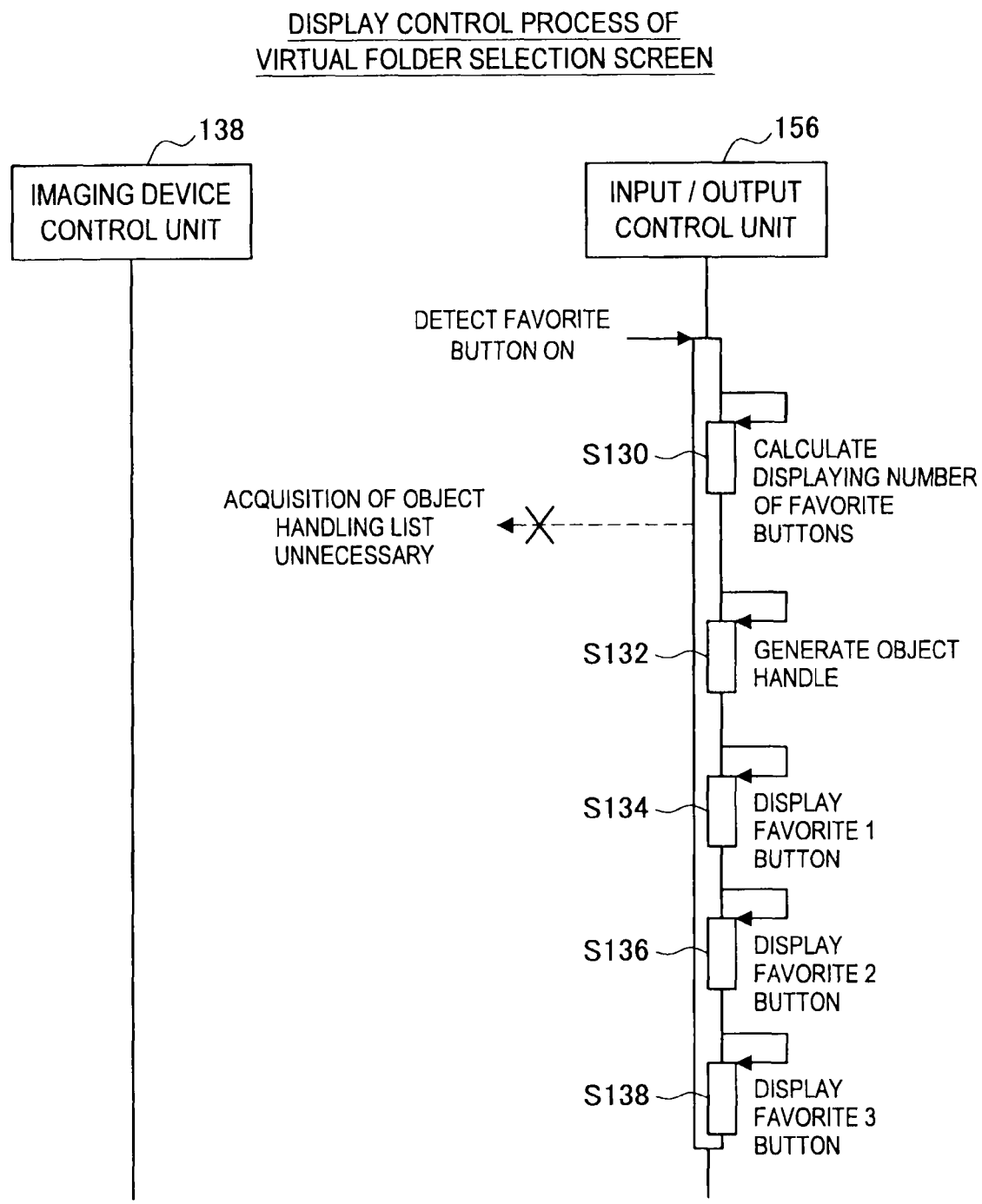
FIG. 13 shows one example of the control process related to the data transmission method of the embodiment.

The display control process of the virtual folder selection screen D21 in the imaging device 100 will now be described below with reference to FIG. 13. FIG. 13 is an explanatory view showing the flow of process executed from when the virtual folder select button B12 ("favorite" button) is pressed until the virtual folder selection screen D21 is displayed.

As shown in FIG. 13, when the virtual folder select button B12 ("favorite" button) is pressed, the input/output control unit 156 starts the display control process of the virtual folder selection screen D21. First, the input/output control unit 156 calculates the number of virtual folders F21 based on the number of virtual select buttons B21 displayable on the virtual folder selection screen D21, and the like (S130). In this case, the input/output control unit 156 does not acquire the object handling list since the information related to the number of virtual folders F21 is already acquired. The input/output control unit 156 then generates the object handling list based on the already acquired number of folder information (S132). The input/output control unit 156 displays the virtual folder select button B21 ("favorite 1", "favorite 2", "favorite 3") on the virtual folder selection screen D21 (S134, S136, S138).

The flow of process executed while transitioning from the category selection screen D1 to the virtual folder selection screen D21 has been described above. As described above, when the technique of the present embodiment is applied, the object handling list is not transmitted between the input/output control unit 156 and the imaging device control unit 138 when displaying the virtual folder selection screen D21. Thus, the screen switching time in transitioning from the category selection screen D1 to the virtual folder selection screen D21 is greatly reduced. As a result, the speed of screen transition to the virtual folder selection screen D21 is increased.

(Regarding Display Control Process of Image Selection Screen)

Figure 14:
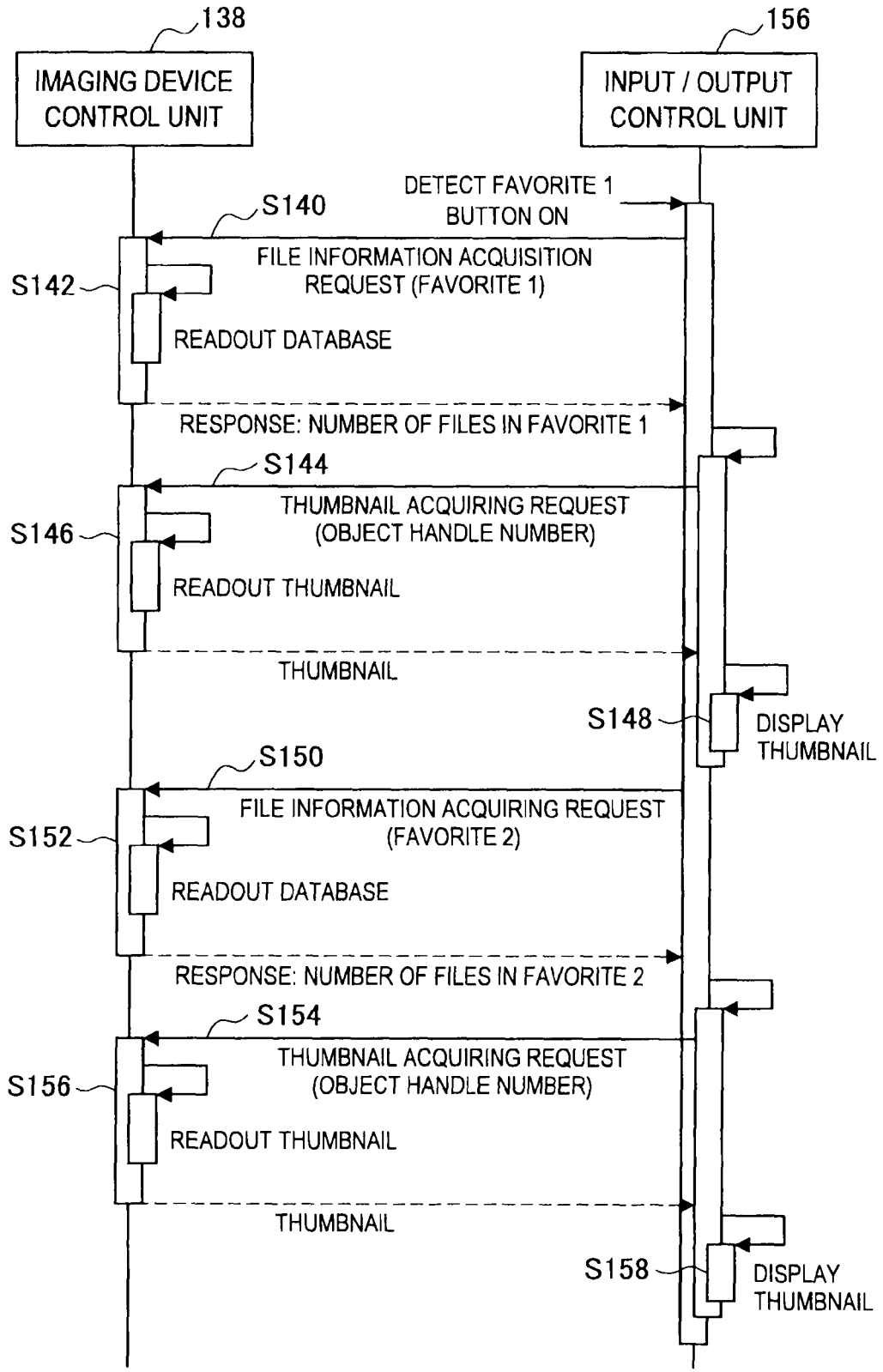
FIG. 14 shows one example of the control process related to the data transmission method of the embodiment.

The display control process of the image selection screen D31 in the imaging device 100 will now be described with reference to FIG. 14. FIG. 14 is an explanatory view showing the flow of process executed from when the virtual folder select button B21 ("favorite 1" button) is pressed until the image selection screen D31 is displayed.

As shown in FIG. 14, when the virtual folder select button B21 ("favorite 1" button) is pressed, the input/output control unit 156 transmits a file information acquiring request ("favorite 1") to the imaging device control unit 138 (S140). The file information acquiring request is a request signal for notifying the imaging device control unit 138 of the number of files registered in the specified virtual folder F21. For instance, when the file information acquiring request specifying "favorite 1" is transmitted, the number of files registered in "favorite 1" is notified from the imaging device control unit 138 to the input/output control unit 156.

When the file information acquiring request ("favorite 1") is transmitted from the input/output control unit 156 to the imaging device control unit 138, the imaging device control unit 138 reads out and references the database recorded in the buffer memory 142 (S142). The imaging device control unit 138 also calculates the number of files registered in the virtual folder F21 ("favorite 1") specified in the file information acquiring request based on the database (S142). The imaging device control unit 138 notifies the input/output control unit 156 of the calculated number of files (number of files in "favorite 1") to (S142).

When the number of files (number of files in "favorite 1") is notified from the imaging device control unit 138 to the input/output control unit 156, the input/output control unit 156 transmits a thumbnail acquiring request targeting on "favorite 1" to the imaging device control unit 138 (S144). The thumbnail acquiring request referred herein is a request signal for specifying the object handle number, and transmitting the thumbnail image of the file corresponding to the specified number to the imaging device control unit 138. When the thumbnail acquiring request is transmitted from the input/output control unit 156 to the imaging device control unit 138, the imaging device control unit 138 reads out the thumbnail image of the specified file from the recording media 140, and transmits the thumbnail image to the input/output control unit 156 (S146).

When the thumbnail image is transmitted from the imaging device control unit 138 to the input/output control unit 156, the input/output control unit 156 displays the thumbnail image acquired from the imaging device control unit 138 on the LCD 162 as the image select button B31 (S148). If the image selection screen D31 contains great amount of blank region, the input/output control unit 156 acquires the thumbnail image registered in another virtual folder F21. For instance, the input/output control unit 156 transmits the file information acquiring request specifying "favorite 2" to the imaging device control unit 138 (S150).

When the file information acquiring request ("favorite 2") is transmitted from the input/output control unit 156 to the imaging device control unit 138, the imaging device control unit 138 reads out and references the database recorded in the buffer memory 142 (S152). The imaging device control unit 138 also calculates the number of files registered in the virtual folder F21 ("favorite 2") specified in the file information acquiring request based on the database (S152). The imaging device control unit 138 notifies the input/output control unit 156 of the calculated number of files (number of files in "favorite 2") (S152).

When the number of files (number of files in "favorite 2") is notified from the imaging device control unit 138 to the input/output control unit 156, the input/output control unit 156 transmits a thumbnail acquiring request targeting on "favorite 2" to the imaging device control unit 138 (S154). When the thumbnail acquiring request is transmitted from the input/output control unit 156 to the imaging device control unit 138, the imaging device control unit 138 reads out the thumbnail image of the specified file from the recording media 140, and transmits the thumbnail image to the input/output control unit 156 (S156).

When the thumbnail image is transmitted from the imaging device control unit 138 to the input/output control unit 156, the input/output control unit 156 displays the thumbnail image acquired from the imaging device control unit 138 on the LCD 162 as the image select button B31 (S158). If the image selection screen D31 does not contain great amount of blank region, the input/output control unit 156 does not acquire the thumbnail image registered in another virtual folder F21, and completes the display process of the image selection screen D31.

The flow of process executed while transitioning from the virtual folder selection screen D21 to the image selection screen D31 has been described above. In the present embodiment, the thumbnail image can be easily acquired since the framework of the PTP is used in the process for acquiring the image data. Only the information on the number of files may be acquired through the signal track of the UART method since the signal track of the UART method is provided in the imaging device 100. The image select button B31 can be displayed using the number of files acquired through the signal track of the UART method, and the speed of screen transition from the virtual folder selection screen D21 to the image selection screen D31 is increased.

(Regarding Favorite Registration Process)

Figure 15:
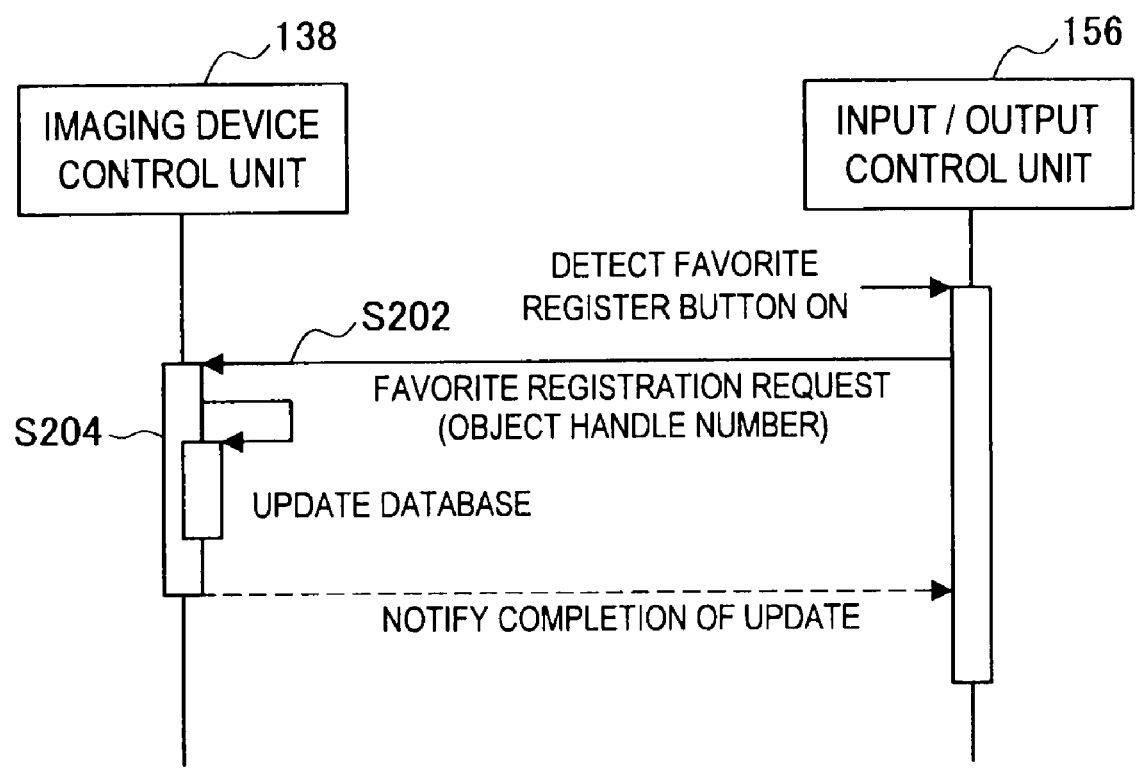
FIG. 15 shows one example of the control process related to the data transmission method of the embodiment.

The registration process of the virtual folder F21 ("favorite 1" etc.) in the imaging device 100 will be described below with reference to FIG. 15. FIG. 15 is an explanatory view showing the flow of process executed until the virtual folder F21 is registered. The example of the display configuration of the registration screen D41 is shown in FIG. 4, and thus reference is also to be made to FIG. 4.

As shown in FIG. 15, when the register button B41 ("favorite register button") is pressed, the input/output control unit 156 transmits a favorite registration request to the imaging device control unit 138 (S202). The "favorite registration request" referred to herein is a request signal for specifying the file displayed on the registration screen D41 and the virtual folder F21 selected by pressing the register button B41, and registering the specified file in the specified virtual folder F21. The file and the virtual folder F21 are specified using the object handle number.

When the favorite registration request is transmitted from the input/output control unit 156 to the imaging device control unit 138, the imaging device control unit 138 updates the database to register the file specified by the favorite registration request in the specified virtual folder F21 (S204). After the update process of the database is completed, the imaging device control unit 138 transmits an update complete notification for notifying that the update of the database is completed to the input/output control unit 156.

The registration process of the virtual folder F21 ("favorite 1" etc.) has been described above.

The flow of control process by the imaging device 100 has been described with reference to FIGS. 11 to 15 to clarify the timing of the data transmission carried out between the imaging device control unit 138 and the input/output control unit 156, and the timing of the calculation process by each unit. As described above, the speed of the screen transition can be increased in the present embodiment since the acquisition process of the object handling list does not occur when acquiring the number of virtual folders F21 or the number of actual files F12 registered in each virtual folder F21.

5: CONTROL PROCESS AND OPERATION INPUT

The flow of control process by the imaging device will now be described with reference to FIGS. 16 to 19. The flow of the entire process including the input operation of the unit will be described here.

(Regarding Initialization Process in Time of Power ON)

First, the flow of the initialization process executed when the power of the imaging device 100 is turned ON will be described with reference to FIG. 16. FIG. 16 is an explanatory view showing the flow of the initialization process executed when the power is ON.

Figure 16:
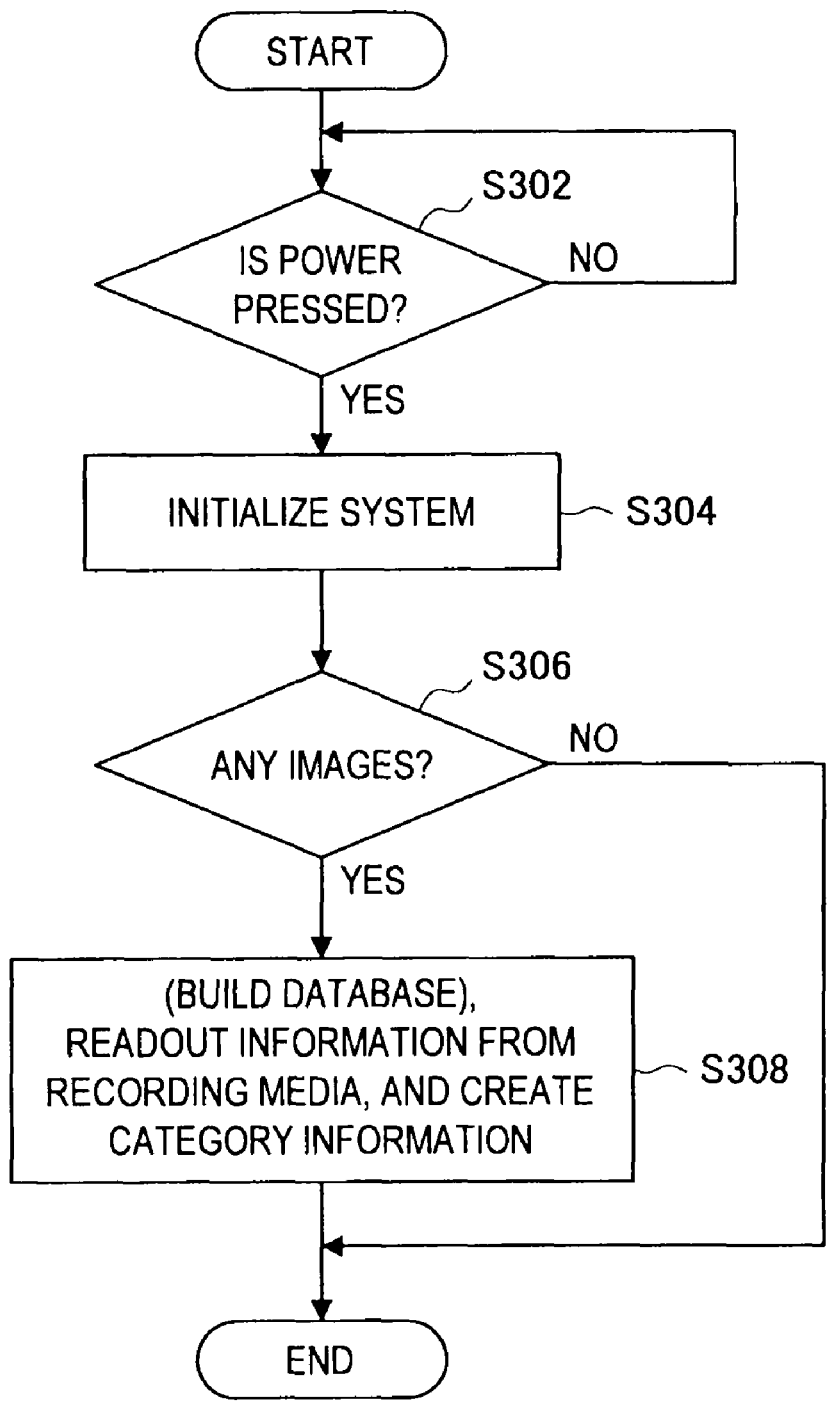
FIG. 16 shows one example of the control process related to the data transmission method of the embodiment.

As shown in FIG. 16, the imaging device 100 first determines whether or not the power key 112 is turned ON (S302). If the power key 112 is turned ON, the imaging device 100 proceeds to the process of step S304. If the power key 112 is turned OFF, the imaging device 100 again returns to step S203, and waits until the power key 112 is turned ON. In step S304, the initialization process of the system is executed by the imaging device 100 (S304). The initialization process executed here is a process of initializing the setting of the lens unit 102 and the like.

The imaging device 100 determines whether or not the image data is present in the recording media 140 (S306). If the image data is present, the imaging device 100 proceeds to the process of step S308. If the image data is not present in the recording media 140, the imaging device 100 terminates the initialization process in time of power ON. In step S308, the database is built by the imaging device 100 (S308). For instance, the information of the image data is read out from the recording media 140, and the information of the image data are organized in the form of database for every category classified by the actual folder F11 and the virtual folder F21. After the building of the database is completed, the imaging device 100 terminates the initialization process in time of power ON.

The flow of the initialization process executed when the power of the imaging device 100 is turned ON has been described above.

(Regarding Category Selection Process)

Figure 17:
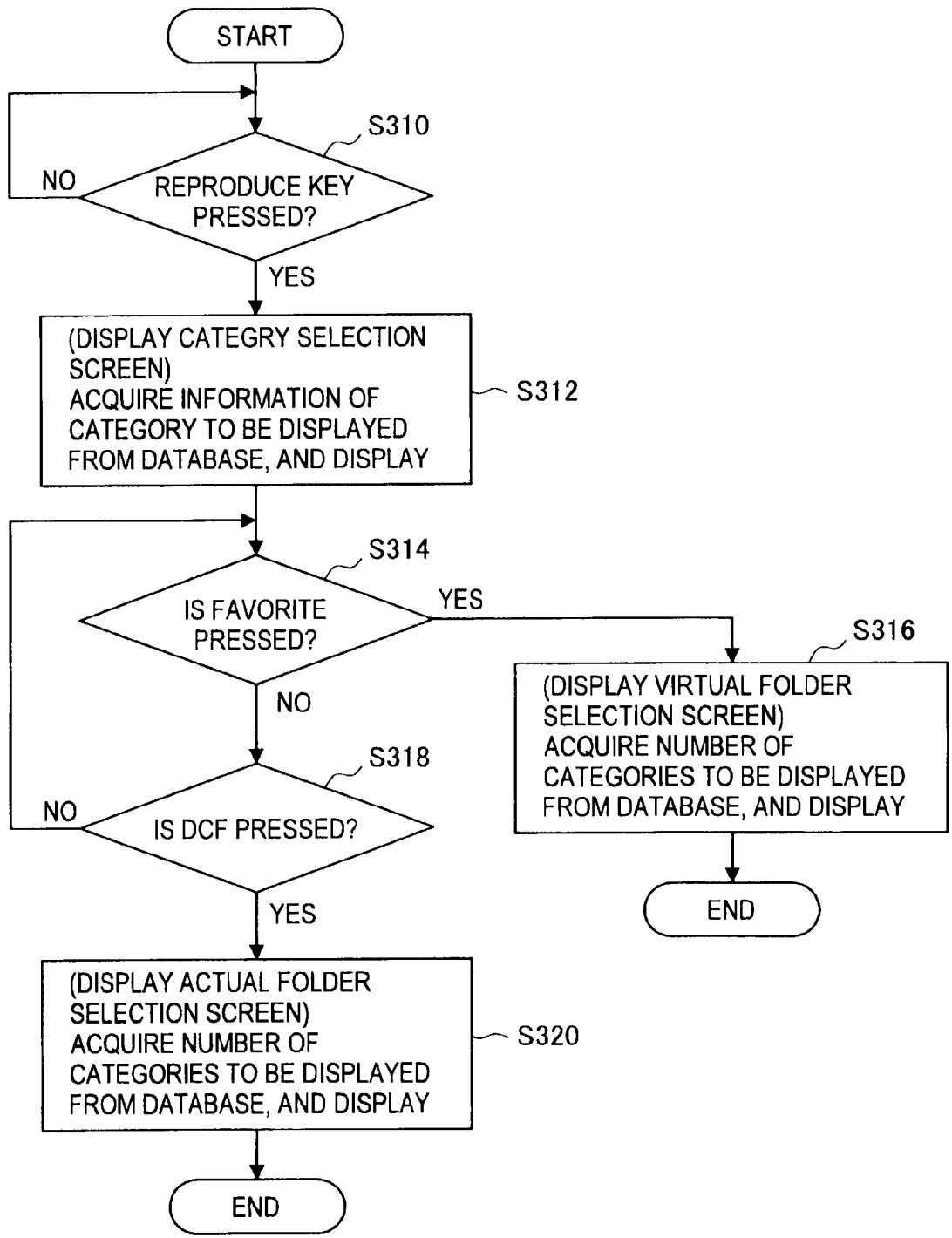
FIG. 17 shows one example of the control process related to the data transmission method of the embodiment.

The flow of the category selection process executed after the reproduce key 104 is pressed will be described below with reference to FIG. 17. FIG. 17 is an explanatory view showing the flow of the category selection process.

As shown in FIG. 17, the imaging device 100 first determines whether or not the reproduce key 104 is pressed (S310). If the reproduce key 104 is pressed, the imaging device 100 proceeds to the process of step S312. If the reproduce key 104 is not pressed, the imaging device 100 again returns to step S310 and waits until the reproduce key 104 is pressed. In step S312, the category selection screen D1 is displayed by the imaging device 100 (S312). In this case, the imaging device 100 acquires the information of the category to be displayed from the database, and displays the actual folder select button B11 ("DCF" button) and the virtual folder select button B12 ("favorite" button).

The imaging device 100 then determines whether or not the virtual folder select button B12 ("favorite" button) is pressed (S314). If the virtual folder select button B12 is pressed, the imaging device 100 proceeds to the process of step S316. If the virtual folder select button B12 is not pressed, the imaging device 100 proceeds to the process of step S318. In step S316, the display process of the virtual folder selection screen D21 is executed by the imaging device 100 (S316). Specifically, the number of categories to be displayed is acquired from the database, and the virtual folder select button B21 is displayed based on the number of categories.

In step S318, the imaging device 100 determines whether or not the actual folder select button B11 ("DCF" button) is pressed (S318). If the actual folder select button B11 is pressed, the imaging device 100 proceeds to the process of step S320. If the actual folder select button B11 is not pressed, the imaging device 100 proceeds to the process of step S314. In step S320, the display process of the actual folder selection screen D22 is executed by the imaging device 100 (S320). Specifically, the number of categories to be displayed is acquired from the database, and the actual folder select button B22 is displayed based on the number of categories.

The process executed from when the reproduce key 104 is pressed until the category is selected, and part of the process executed after the category is selected have been described.

(Regarding Selection Process of Favorite Folder)

Figure 18:
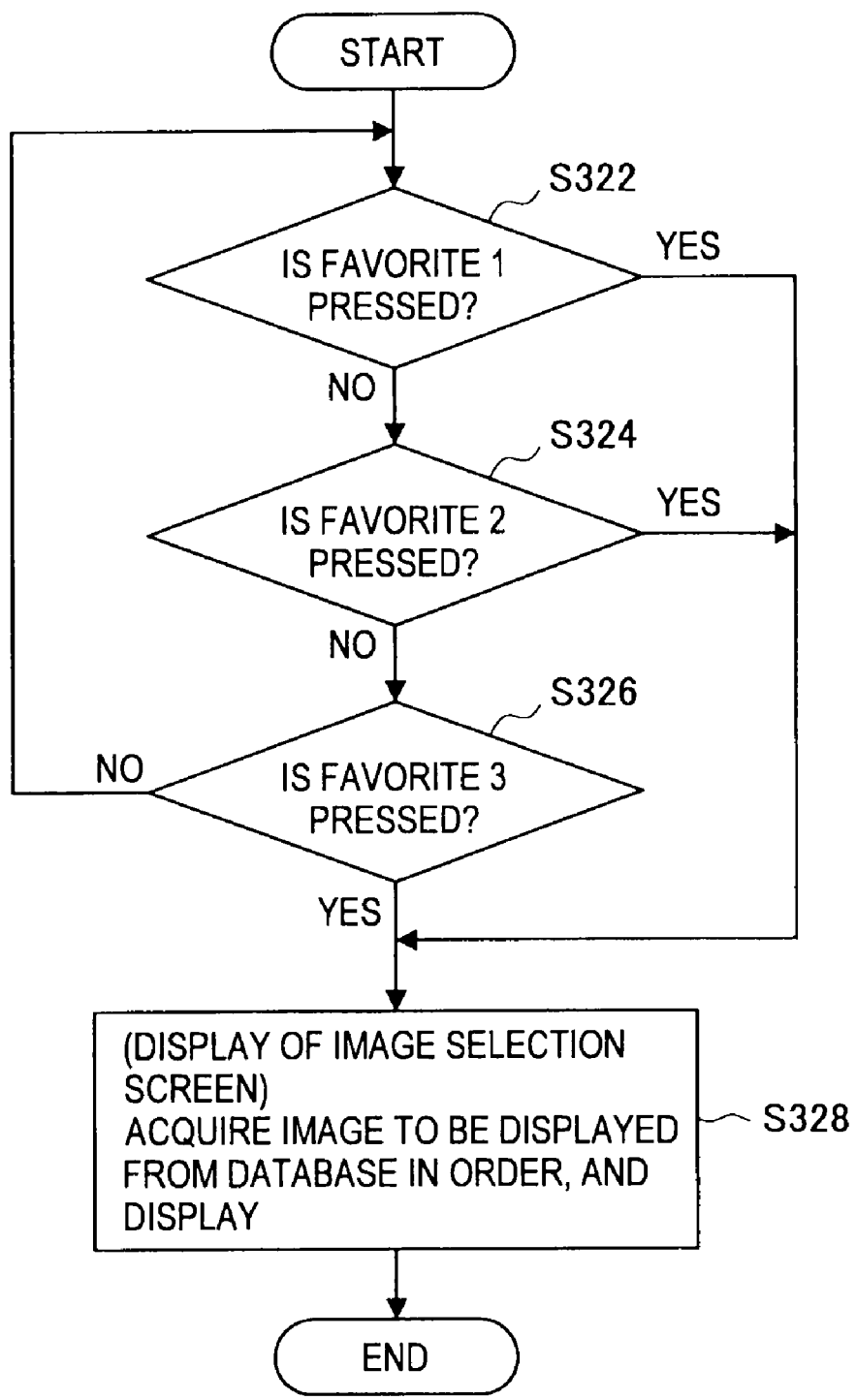
FIG. 18 shows one example of the control process related to the data transmission method of the embodiment.

The flow of process executed when the virtual folder select button B21 ("favorite 1", "favorite 2", "favorite 3") is selected in the virtual folder selection screen D21 will be described with reference to FIG. 18. FIG. 18 is an explanatory view showing the flow of selection process of the favorite folder. The process shown in FIG. 18 is executed after the process of step S316 shown in FIG. 17 is completed.

As shown in FIG. 18, first the imaging device 100 determines whether or not the virtual folder select button B21 of "favorite 1" is pressed (S322). The imaging device proceeds to the process of step S328 if the virtual folder select button B21 of "favorite 1" is pressed. The imaging device proceeds to the process of step S324 if the virtual folder select button B21 of "favorite 1" is not pressed.

In step S324, the imaging device 100 determines whether or not the virtual folder select button B21 of "favorite 2" is pressed (S324). The imaging device 100 proceeds to the process of step S328 if the virtual folder select button B21 of "favorite 2" is pressed. The imaging device 100 proceeds to the process of step S326 if the virtual folder select button B21 of "favorite 2" is not pressed.

In step S326, the imaging device 100 determines whether or not the virtual folder select button B21 of "favorite 3" is pressed (S326). The imaging device proceeds to the process of step S328 if the virtual folder select button B21 of "favorite 3" is pressed. The imaging device proceeds to the process of step S322 if the virtual folder select button B21 of "favorite 3" is not pressed.

In step S328, the display process of the image selection screen D31 is executed by the imaging device 100 (S328). In this case, the imaging device 100 acquires the image data, the thumbnail image, and the like to be displayed from the database, and displays the same on the LCD 162. After the display process of the image selection screen D31 is completed, the imaging device 100 terminates the selection process of the favorite folder. The flow of process executed from when the virtual folder select button B21 is pressed on the virtual folder selection screen D31 until the image selection screen D31 is displayed has been described above.

(Regarding Registration Process of Favorite Image)

Figure 19:
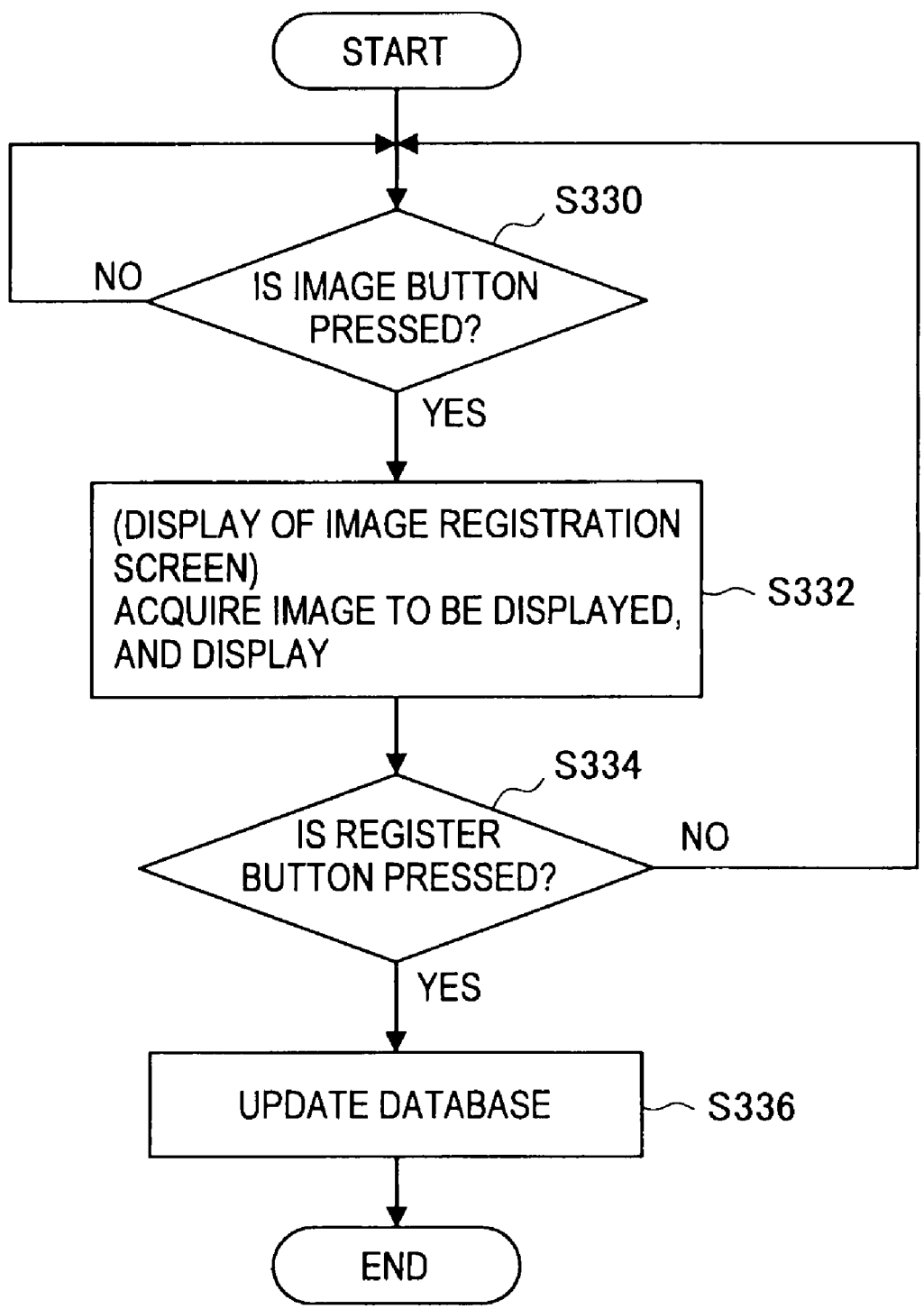
FIG. 19 shows one example of the control process related to the data transmission method of the embodiment.

The flow of registration process of the favorite image will now be described with reference to FIG. 19. FIG. 19 is an explanatory view showing the flow of registration process of the favorite image.

As shown in FIG. 19, the imaging device 100 first determines whether or not the image select button B31 is pressed on the image selection screen D31 (S330). The imaging device 100 proceeds to the process of step S332 if the image select button B31 is pressed. The imaging device 100 again returns to step S330 if the image select button B31 is not pressed, and waits until the image select button B31 is pressed. In step S332, the imaging device 100 displays the registration screen D41 of the image data (S332). In this case, the imaging device 100 acquires the image to be displayed, and displays the registration screen D41.

The imaging device 100 then determines whether or not the register button B41 is pressed (S334). The imaging device 100 proceeds to the process of step S336 if the register button B41 is pressed. The imaging device 100 again proceeds to the process of step S330 if the register button B41 is not pressed. In step S336, the imaging device 100 updates the database (S336). After the update process of the database is completed, the imaging device 100 terminates the registration process of the favorite image.

The flow of registration process of the favorite image has been described above.

As described above, applying the technique of the present embodiment, the transmission process of the object handling list can be omitted when acquiring the information of the categorized image data through the signal track of the USB method. Thus, when transitioning to the selection screen of category etc., the time for screen transition can be reduced by the time the transmission process of the object handling list is not carried out. As a result, the speed of the screen transition is significantly increased, and the user does not feel stress when performing the operation of selecting image data.

6: CONCLUSION

Lastly, the function configuration of the imaging device of the present embodiment and the effects obtained by such function configuration will be briefly summarized.

First, the function configuration of the imaging device according to the present embodiment can be described as below. The imaging device is configured by a first processing unit and a second processing unit. The first and second processing units are connected by first and second signal lines. Furthermore, the second processing unit includes a group object display unit, a data object display unit, and a data transmission requesting unit having the following functions.

With respect to the data divided to one or a plurality of groups, the first processing unit transmits to the second processing unit the data of the specified data position through the first signal line when the group and the data position in the group are specified. Thus, when searching the data to transmit to the second processing unit, the search target is limited to the specified group and the speed of the search process is increased by specifying the group and the data position in the group.

The group object display unit displays on the screen the group object for selecting each group by the number determined based on the number of groups. At least the number of groups is to be known when displaying the group object for selecting the group instead of displaying the data itself. Thus, the group object display unit displays the group object by the number determined based on the number of groups. The group object display unit may display the group object by the number of groups, but may display the group object by the number displayable on the screen if the number displayable on the screen is smaller than the number of groups. According to such configuration, the speed of the display process of the group object can be increased. The object handling list is to be acquired in the first place to obtain the number of groups in the framework of the PTP. However, the process of acquiring the object handling list is unnecessary if the information related to the number of groups is held, and the display process of the group object is performed using such information. As a result, the speed of the display process can be increased.

When the group object displayed on the screen is selected, the data object display unit displays the data object for selecting each data by the number determined based on the number of data belonging to the group of the selected group object. The number of data belonging to the group is to be at least known when displaying the data object for selecting the data instead of displaying the data itself. Thus, the data object display unit displays the data object by the number determined based on the number of data in the group. The data object display unit may display the data object by the number of data in the group, but may display the data object by the number displayable on the screen if the number displayable on the screen is smaller than the number of data in the group. According to such configuration, the speed of the display process of the data object can be increased.

The data transmission requesting unit specifies the group to which the data of the selected data object belongs and the data position of the group and requests the first processing unit for the transmission of the data when the data object is selected. Thus, when searching the data transmitted by the first processing unit, the search target is limited to the specified group and the speed of the search process is increased by specifying the group and the data position in the group.

The second processing unit may include a number of group acquiring unit for acquiring the number of groups from the first processing unit through a second signal line different from the first signal line. In this case, the group object display unit displays the group object based on the number of groups acquired through the second signal line by the number of group acquiring unit. Thus, if the number of groups is acquired by the number of group acquiring unit, the group object can be displayed at high speed using the acquired number of groups. However, the information on the number of groups is difficult to acquire without acquiring the object handling list in the framework of the PTP. The information on the number of groups is thus acquired through the second signal line.

The second processing unit may also include a number of data acquiring unit for acquiring the number of data belonging to the group of the selected group object, when the group object is selected, from the first processing unit through the second signal line different from the first signal line. In this case, the data object display unit displays the data object based on the number of data acquired through the second signal line by the number of data acquiring unit. Thus, if the number of data is acquired by the number of data acquiring unit, the data object can be displayed at high speed using the acquired number of data. However, the information on the number of data is difficult to acquire without acquiring the object handling list in the framework of the PTP. The information on the number of data is thus acquired through the second signal line.

When the number of data acquired by the number of data acquiring unit is greater than the number of data objects displayable on one screen, the data transmission requesting unit requests for the transmission of the data by the number same as the number of data objects displayable on one screen. The data object not displayed on the screen may not be selected. Thus, even if the data of the data object not displayed on the screen is acquired, the user may not select such data. Therefore, the data of the same number as the data object displayed on the screen is to be acquired. As a result, the time for displaying the display screen of the data object is reduced as the data of the data object not displayed on the screen is not acquired, and the speed of the screen transition is increased.

When the number of data belonging to the group of the selected group object is smaller than the number of data objects displayable on one screen, the number of data acquiring unit may acquire the number of data belonging to another group different from the relevant group. In this case, the data object display unit further displays the data object of the data belonging to another group. If the number of data in the selected group is small, a blank region is included in the screen. However, if the desired data is not contained in the selected group, another group is reselected to again display the data objects. Thus, many as possible data objects are preferably displayed on one screen. Since the number of data is already acquired, the comparison of the displayable number and the number of data is simple. The acquisition process of the data object of the data belonging to another group may be proceeded based on such comparison result so that the blank region is not included in the screen as much as possible. As a result, the operability of the user significantly enhances.

If the number of data belonging to another group is acquired by the number of data acquiring unit, the data transmission requesting unit requests for the transmission of data belonging to another group by the amount displayed by the data object display unit. Thus, when only the data that is to be acquired is acquired in order, great number of extra data is not acquired, and the communication load and the transmission time can be reduced. As a result, the speed of the screen transition can be increased.

The data transmission requesting unit may be configured to transmit a transmission frame including group information for specifying the group, data position information for indicating the data position in the group specified by the group information, and the data attribute information indicating the attribute of the data specified by the data position information. Furthermore, the transmission frame may also include a group attribute indicating whether the group is automatically generated or is generated beforehand by the user. The search target can be narrowed when searching the data to be transmitted by the first processing unit and the speed of the search process can be increased by specifying the attribute etc. with respect to the group and the data. As a result, the time necessary until the data is transmitted is reduced, which contributes to increasing the speed of screen transition.

For instance, the first signal line is a signal line of USB (Universal Serial Bus) method. The second signal line is a signal line of UART (Universal Asynchronous Receiver Transmitter) method. In this case, the data transmission requesting unit requests for the transmission of the data using a PTP (Picture Transfer Protocol) command.

(Remark)

The imaging device control unit 138 serves as the first processing unit. The input/output control unit 156 serves as the second processing unit. Therefore, the input/output control unit 156 serves as the group object display unit, the data object display unit, the data transmission requesting unit, the number of group acquiring unit, and the number of data acquiring unit. The category, the actual folder F11, and the virtual folder F21 serve as groups. The signal track of the USB method serves as the first signal line. The signal track of the UART method serves as the second signal line. The actual folder select buttons B11, B22 and the virtual folder select buttons B12, B21 serve as group object. The image select buttons B31, B32 serve as data object. The touch panel 108 and the LCD 162 serve as the screen.

It should be understood by those skilled in the art that various modifications, combinations, sub-combinations and alterations may occur depending on design and other factors insofar as they are within the scope of the appended claims or the equivalents thereof.

The present application contains subjected matter related to that disclosed in Japanese Priority Patent Application JP 2008-253971 filed in the Japan Patent Office on Sep. 30, 2008, the entire contents of which is hereby incorporated by reference.

What is claimed is:

1. An imaging device comprising:
a display unit;
a memory unit that stores a data structure of folders, files, and virtual folders;
an imagine device control unit that internally transmits a number of the virtual folders through an Universal Asynchronous Receiver Transmitter (UART) signal line to an input/output control unit within the imaging device, and that internally transmits a number of the files associated with at least one of the virtual folders through the UART signal line to the input/output control unit, wherein the UART signal line does not use picture transfer protocol;
wherein the input/output control unit including
a) a control unit that displays, on the display unit, icons for selecting the virtual folders based on the number of the virtual folders, that receives a selection of the at least one of the virtual folders, and that displays icons for selecting the files associated with the at least one of the virtual folders based on the number of the files associated with the at least one of the virtual folders, and
b) a requesting unit that requests at least one file associated with the at least one of the virtual folders from the imaging device control unit through an Universal Serial Bus (USB) signal line, wherein the USB signal line uses the picture transfer protocol,
wherein when the number of the files associated with the at least one of the virtual folders is greater than a predetermined number of data objects displayable on one screen of the display unit, the requesting unit requests internal transmission of a subset of the files associated with the at least one of the virtual folders from the imaging device control unit through the USB signal line that is equal to the predetermined number of data objects displayable on the one screen of the display unit, and
wherein when the number of the files associated with the at least one of the virtual folder is smaller than a predetermined number of data objects displayable on the one screen of the display unit, the requesting unit requests internal transmission of additional files from another virtual folder from the imaging device control unit through the USB signal line in order to be equal to the predetermined number of data object displayable on the one screen of the display unit.

2. The imaging device according to claim 1, wherein the requesting unit transmits a data frame including identification information that specifies the at least one virtual folder, data position information indicating a data position of the at least one file in the virtual folder, and attribute information of the at least one file.

3. The imaging device according to claim 2, wherein the data frame includes information indicating that the at least one file is in the at least one virtual folder.

4. The imaging device according to claim 2, wherein the attribute information of the at least one file indicates that the at least one file is a still image file.

5. The imaging device according to claim 2, wherein the attribute information of the at least one file indicates that the at least one file is a moving image file.

6. The imaging device according to claim 2, wherein the attribute information of the at least one file indicates that the at least one file is an audio file.

7. A method comprising:
  storing a data structure of folders, files, and virtual folders in a memory device of an imaging device;
  internally transmitting, with an imaging device control unit of the imaging device, a number of the virtual folders through an Universal Asynchronous Receiver Transmitter (UART) signal line to an input/output control unit within the imaging device;
  internally transmitting, with the imaging device control unit of the imaging device, a number of the files associated with at least one of the virtual folders through the UART signal line to the input/output control unit, wherein the UART signal line does not use picture transfer protocol;
  displaying, with a control unit of the input/output control unit of the imaging device, icons for selecting the virtual folders based on the number of the virtual folders;
  receiving, with the control unit of the input/output control unit of the imaging device, a selection of the at least one of the virtual folders;
  displaying, with the control unit of the input/output control unit of the imaging device, icons for selecting the files associated with the at least one of the virtual folders based on the number of the files associated with the at least one of the virtual folders; and
  requesting, with a requesting unit of the input/output control unit of the imaging device, the at least one file associated with the at least one of the virtual folders from the imaging device control unit through an Universal Serial Bus (USB) signal line, wherein the USB signal line uses the picture transfer protocol, wherein
    when the number of the files associated with the at least one of the virtual folders is greater than a predetermined number of data objects displayable on one screen of a display unit, the requesting includes requesting internal transmission of a subset of the files associated with the at least one of the virtual folders from the imaging device control unit through the USB signal line that is equal to the predetermined number of data objects displayable on the one screen of the display unit, and
    when the number of the files associated with the at least one of the virtual folder is smaller than a predetermined number of data objects displayable on the one screen of the display unit, the requesting includes requesting internal transmission of additional files from another virtual folder from the imaging device control unit through the USB signal line in order to be equal to the predetermined number of data object displayable on the one screen of the display unit.

8. A non-transitory computer readable storage medium encoded with instructions, which when executed by an imaging device cause the imaging device to execute a method comprising:
  storing a data structure of folders, files, and virtual folders in a memory device of the imaging device;
  internally transmitting, with a imaging device control unit of the imaging device, a number of the virtual folders through an Universal Asynchronous Receiver Transmitter (UART) signal line to an input/output control unit within the imaging device;
  internally transmitting, with the imaging device control unit of the imaging device, a number of the files associated with at least one of the virtual folders through the UART signal line to the input/output control unit, wherein the UART signal line does not use picture transfer protocol;
  displaying, with a control unit of the input/output control unit of the imaging device, icons for selecting the virtual folders based on the number of the virtual folders;
  receiving, with the control unit of the input/output control unit of the imaging device, a selection of the at least one of the virtual folders;
  displaying, with the control unit of the input/output control unit of the imaging device, icons for selecting the files associated with the at least one of the virtual folders based on the number of the files associated with the at least one of the virtual folders; and
  requesting, with a requesting unit of the input/output control unit of the imaging device, the at least one file associated with the at least one of the virtual folders from the imaging device control unit through an Universal Serial Bus (USB) signal line, wherein the USB signal line uses the picture transfer protocol, wherein
    when the number of the files associated with the at least one of the virtual folders is greater than a predetermined number of data objects displayable on one screen of a display unit, the requesting includes requesting internal transmission of a subset of the files associated with the at least one of the virtual folders from the imaging device control unit through the USB signal line that is equal to the predetermined number of data objects displayable on the one screen of the display unit, and
    when the number of the files associated with the at least one of the virtual folder is smaller than a predetermined number of data objects displayable on the one screen of the display unit, the requesting includes requesting internal transmission of additional files from another virtual folder from the imaging device control unit through the USB signal line in order to be equal to the predetermined number of data object displayable on the one screen of the display unit.

* * * * *